(12) United States Patent
Furihata et al.

(10) Patent No.: US 6,512,507 B1
(45) Date of Patent: Jan. 28, 2003

(54) POINTING POSITION DETECTION DEVICE, PRESENTATION SYSTEM, AND METHOD, AND COMPUTER-READABLE MEDIUM

(75) Inventors: Takeshi Furihata, Okaya (JP); Kazunori Hiramatsu, Okaya (JP); Kunio Yoneno, Shiojiri (JP); Junichi Nakamura, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/276,817

(22) Filed: Mar. 26, 1999

(30) Foreign Application Priority Data

Mar. 31, 1998 (JP) .......................... 10-103841
Mar. 31, 1998 (JP) .......................... 10-103842
Mar. 31, 1998 (JP) .......................... 10-103843

(51) Int. Cl.[7] ................................ G09G 5/08
(52) U.S. Cl. ........................ 345/157; 345/158
(58) Field of Search ................. 345/156, 157, 345/158, 175, 9; 348/61, 207; 353/122

(56) References Cited

U.S. PATENT DOCUMENTS

| | | | | |
|---|---|---|---|---|
| 4,280,135 A | * | 7/1981 | Schlossberg | 348/61 |
| 4,430,526 A | * | 2/1984 | Brown et al. | 345/175 |
| 5,115,230 A | * | 5/1992 | Smoot | 345/9 |
| 5,138,304 A | * | 8/1992 | Bronson | 345/157 |
| 5,502,459 A | * | 3/1996 | Marshall et al. | 345/158 |
| 5,504,501 A | * | 4/1996 | Hauck et al. | 345/158 |
| 5,515,079 A | * | 5/1996 | Hauck | 345/157 |
| 5,528,263 A | * | 6/1996 | Platzker et al. | 345/156 |
| 5,572,251 A | * | 11/1996 | Ogawa et al. | 348/207 |
| 5,682,181 A | * | 10/1997 | Nguyen et al. | 345/158 |
| 5,914,783 A | * | 6/1999 | Barrus | 356/375 |
| 5,917,472 A | * | 6/1999 | Perala | 345/157 |
| 5,933,135 A | * | 8/1999 | Martin | 345/179 |
| 5,973,672 A | * | 10/1999 | Rice et al. | 345/158 |
| 6,050,690 A | * | 4/2000 | Shaffer et al. | 353/122 |

* cited by examiner

*Primary Examiner*—Steven Saras
*Assistant Examiner*—Uchendu O. Anyaso
(74) *Attorney, Agent, or Firm*—Oliff & Berridge, PLC

(57) ABSTRACT

The present invention relates to a pointing position detection device that can automatically sense a pointing position within a display region. This pointing position detection device comprises a CCD camera acquiring an image of a display region in which an image has been displayed; a binary-data processing section for detecting a pointing position of a shadow region or an actual image region that is an image region of a pointing image included within an image-acquisition area, based on an image-acquisition signal of the CCD camera 14; and a pointing coordinates detection section.

27 Claims, 23 Drawing Sheets

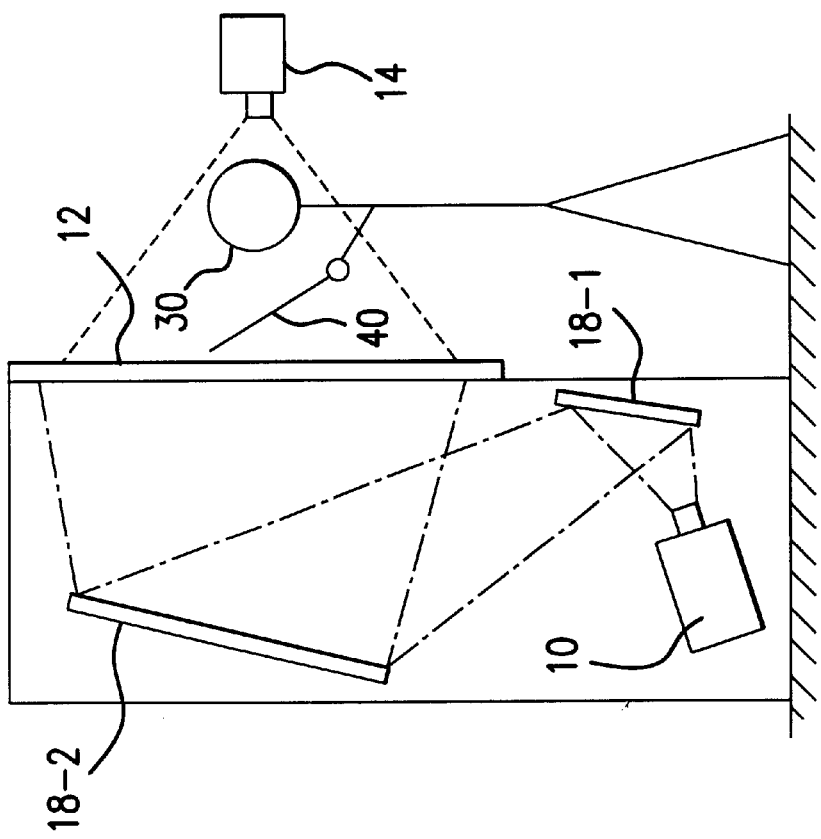
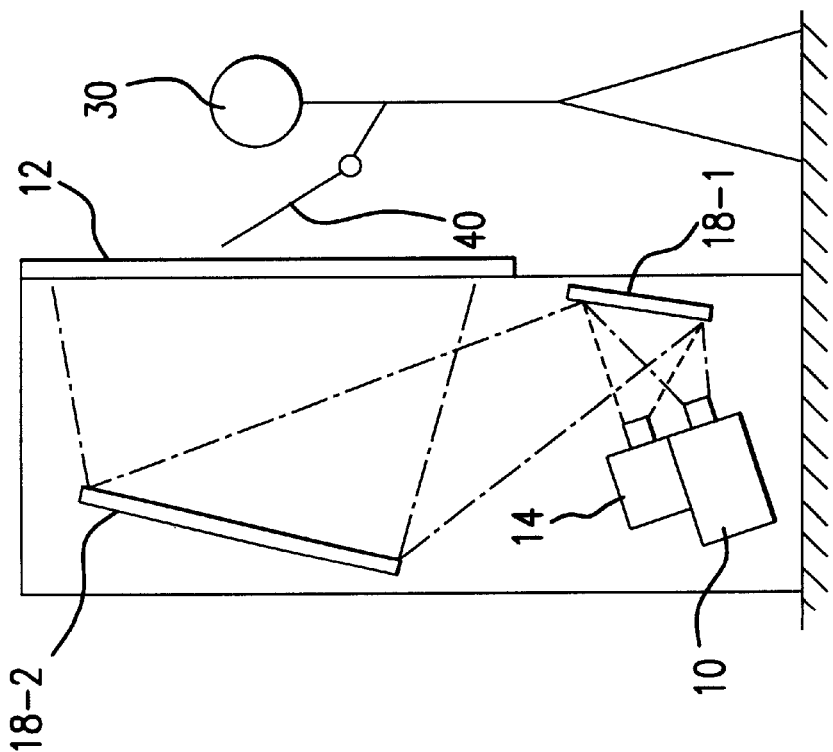

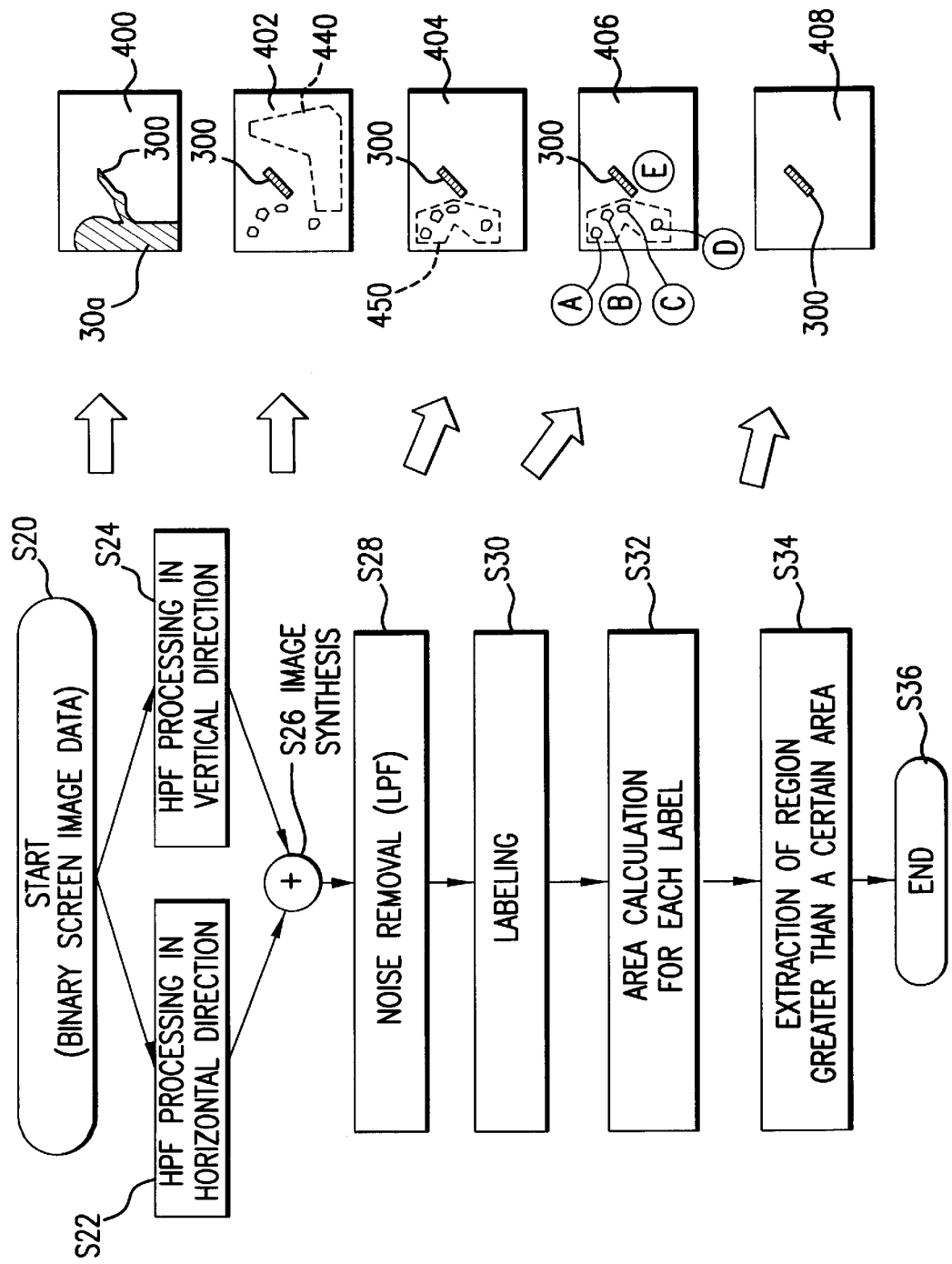

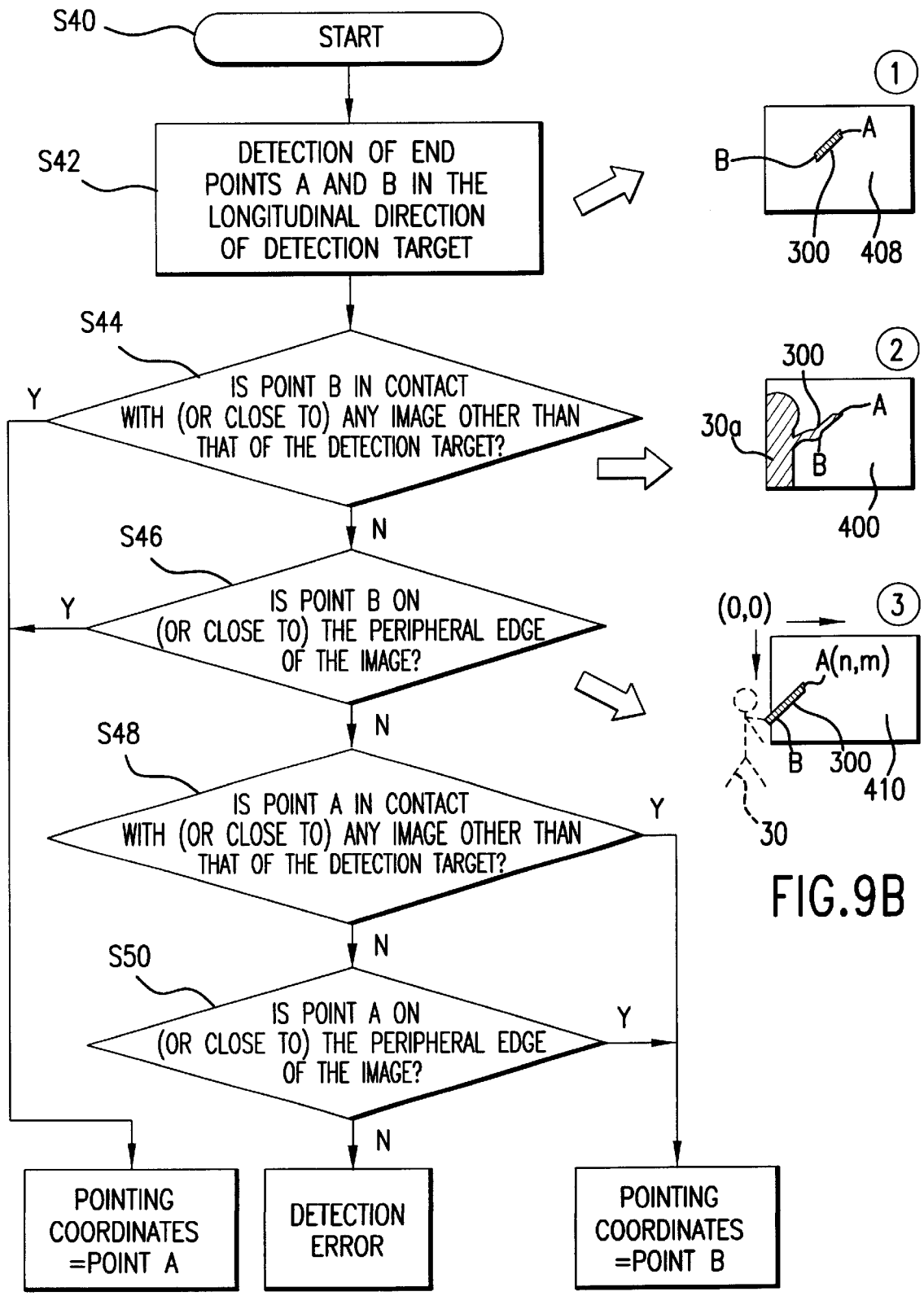

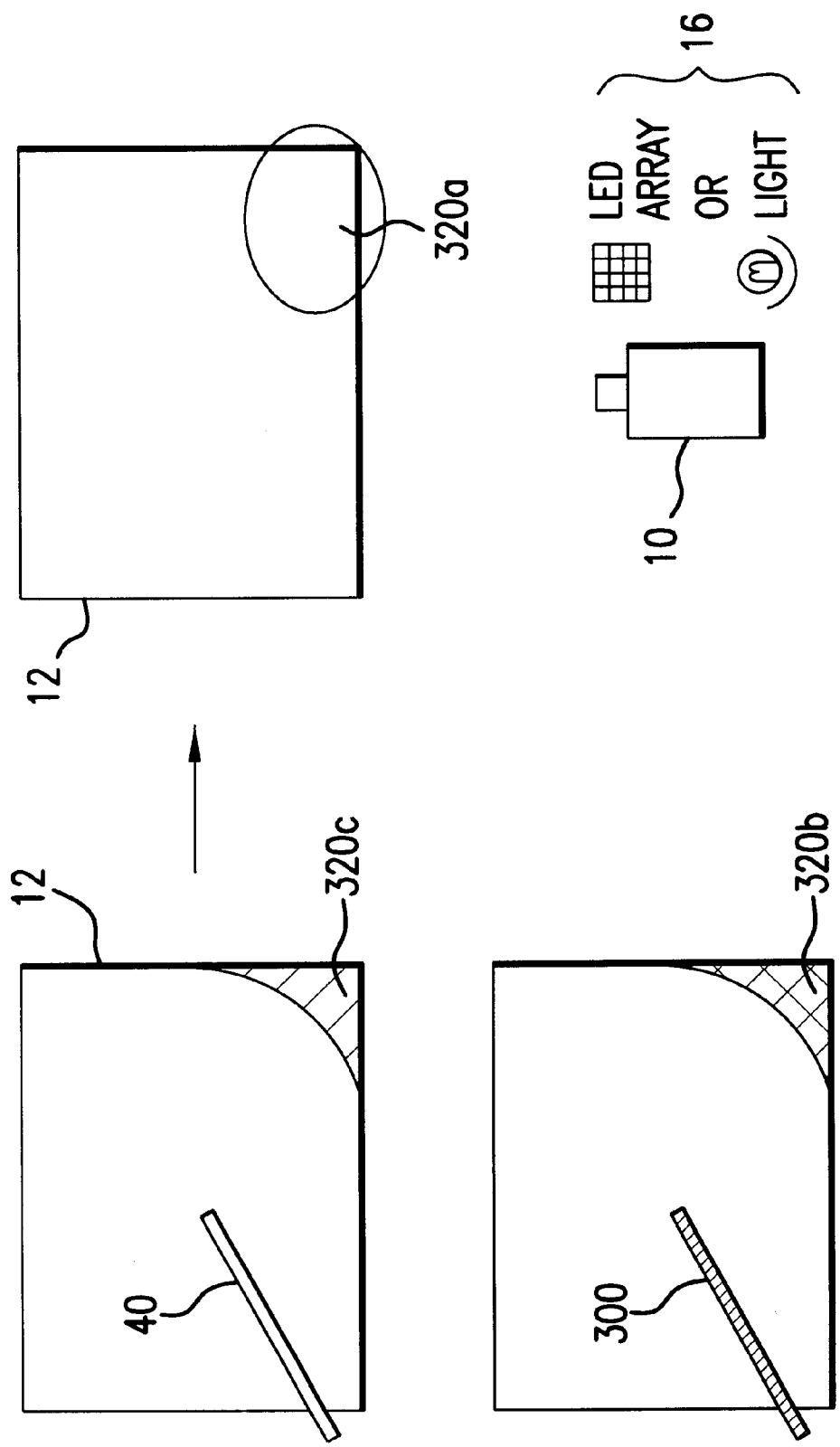

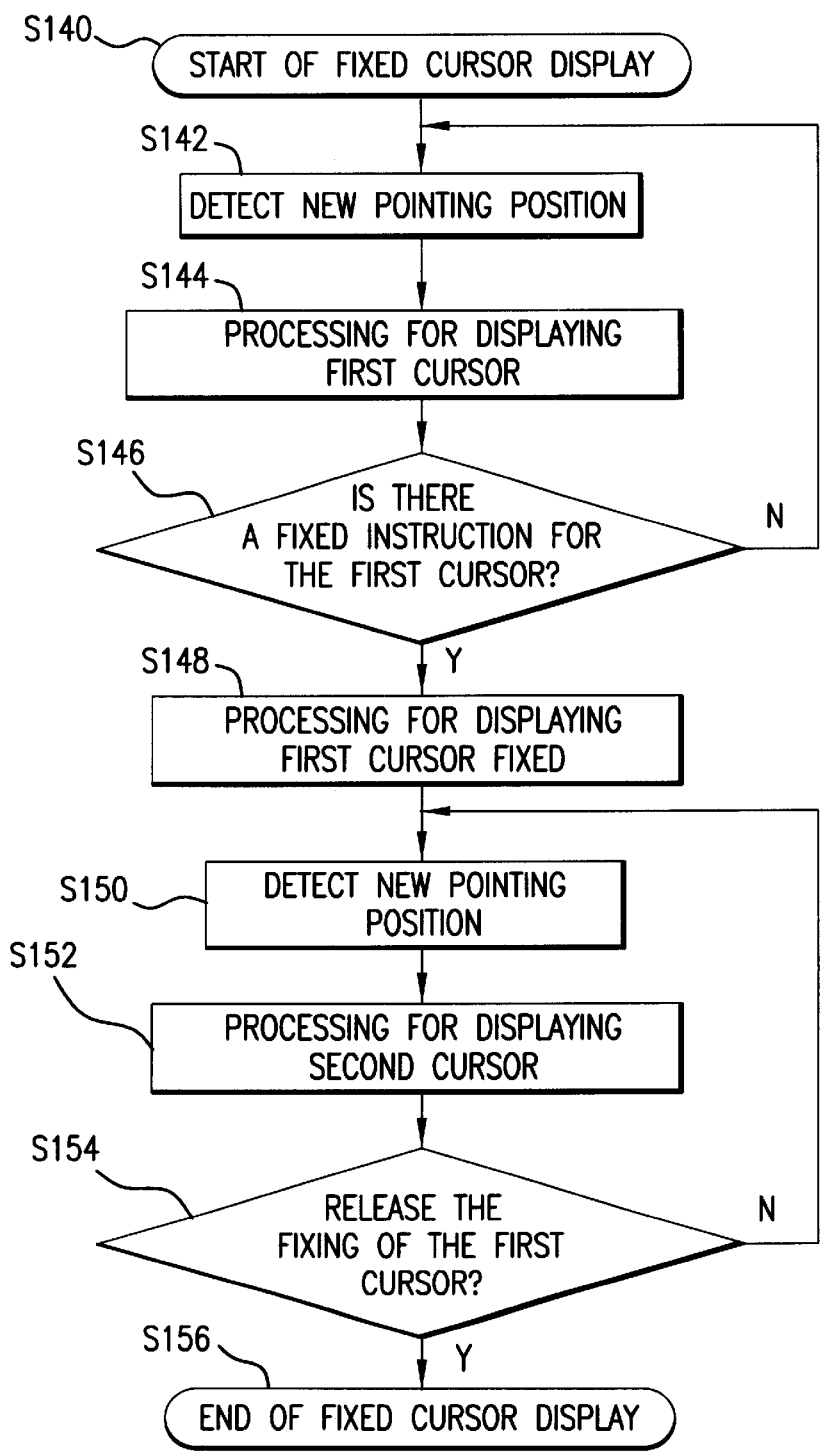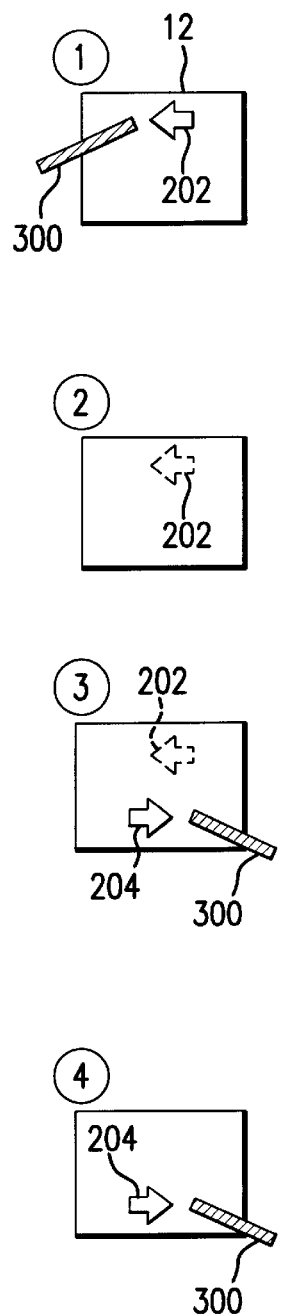
FIG.20

POINTING POSITION DETECTION DEVICE, PRESENTATION SYSTEM, AND METHOD, AND COMPUTER-READABLE MEDIUM

BACKGROUND OF THE INVENTION

1. Field of the Invention

The present invention relates to the present invention pointing position detection device, presentation system, method, and an information storage medium.

2. Background Art

In case a presenter is assumed to be giving a presentation while viewing a screen-image that appears on a screen, the presenter goes through the presentation while using a pointing device to indicate any of various points on the screen.

With such a system, it is important that the presenter can indicate any point on the screen in a simple manner, and it is also important that the system can reliably perceive that pointing position and can copy the pointing position for image processing.

However, when the presenter indicates desired points in a prior-art system, a problem arises in that a special pointing device has to be used therefor, which is extremely inconvenient for the user.

If, for example, a laser pointer is used to indicate a desired point on the screen, the pointing position is difficult to see if the surroundings of the screen are not dark enough. Since the pointing position is displayed as a small dot, this also causes a problem in that the pointing position is difficult to see.

If a pointing device such as a mouse is used for giving a presentation while moving a cursor position that is displayed on the screen, the presenter must interrupt the presentation to a certain degree, to operate the mouse. This causes problems in that the presentation cannot proceed smoothly and the operation is extremely inconvenient.

SUMMARY OF THE INVENTION

An objective of the present invention is to provide a pointing position detection device, presentation system, and method, and a computer-readable medium in which a pointing position within a display region can be sensed automatically and accurately, without using a special device as a point indication tool.

In order to achieve the objective described above, a pointing position detection device of the present invention comprises:
 image-acquisition means for acquiring an image of a display region in which an image is displayed; and
 position detection means for detecting a pointing position from an image region of a pointing image included within the display region, based on an image-acquisition signal of the image-acquisition means.

A method in accordance with the present invention comprises:
 an image-acquisition step of acquiring a picture of a display region in which an image is displayed; and
 a position detection step of detecting a pointing position from an image region of a pointing image included within the display region.

When the presenter indicates a desired position in the display region in which a image is displayed with a predetermined indication tool such as a rod or finger, this aspect of the invention ensures that this indicated position can be detected as the pointing position, based on the image region of the pointing image generated by this indicator.

This makes it possible to implement a pointing position detection device that is extremely convenient to use.

A pointing position detection device in another aspect of the present invention comprises:
 image-acquisition means for acquiring an image of a display region in which an image is displayed;
 reference-value setting means for setting a reference value for separating an image region of a pointing image included within the display region, from an image-acquisition signal of the image-acquisition means; and
 position detection means for detecting a pointing position from the image region of the pointing image, by comparing the image-acquisition signal and the reference value and thus extracting the image region of the pointing image,
 wherein the reference-value setting means is configured to be capable of modifying the reference value.

A pointing position detection method in this aspect of the present invention comprises:
 an image-acquisition step of acquiring an image of a display region in which an image is displayed; and
 a position detection step of comparing an image-acquisition signal with a reference value for separating an image region of a pointing image and thus extracting the image region of the pointing image, then detecting a pointing position from the image region of the pointing image,
 wherein the position detection step comprises a step of modifying the reference value for separating the image region of the pointing image included within the display region from the image-acquisition signal of an image-acquisition means.

This aspect of the present invention extracts the image region of a pointing image created by the indicating action of an operator within a display region in which an image is displayed, from an image acquired by the image-acquisition means, and thus automatically detects a pointing position.

When the image-acquisition signal that is output from the image-acquisition means is that of a monochrome image, for example, a binary threshold value for extracting the image region of the pointing image from this image-acquisition signal could be set as the reference value.

This reference value is basically set to a value that is lower than the black-level brightness of an image acquired by the image-acquisition means. This is because the color in the screen image that has the lowest brightness is black, so the brightness of the image region of the pointing image is lower than the black brightness level.

If the margin between the black level of the image displayed on the display region and the reference value for the binary-encoding is too large in this case, a problem will arise in that the brightness level of the image region of the pointing image will not fall as far as below that reference level and it will not be possible to detect the image region of the pointing image.

Conversely, when the margin for the reference value is too small, the image target that is not the image region of the pointing image will be recognized erroneously as the image region of the pointing image. When the brightness within the display region varies somewhat due to ambient environmental conditions, for example, this will cause a problem in that the variation will be perceived erroneously as the image region of the pointing image.

Therefore, if this reference value is not set to a value that is suitable for the environment in which the system is used, a problem will arise in that it will be difficult to detect the image region of the pointing image appropriately.

Another aspect of the present invention is configured to make it possible to modify the reference value that is used for separating the image region of a pointing image from an image-acquisition signal. This solves the problem described above and makes it possible to accurately extract the image region of a pointing image that is formed on the display region, and thus detect the pointing position automatically.

The position detection means or step in this aspect may be configured in such a manner that a predetermined position of a shadow region of the pointing image included within the display region is detected as the pointing position.

Alternatively, the position detection means or step may be configured in such a manner that a predetermined position of a real-image region of the pointing image included within the display region is detected as the pointing position.

Alternatively, the position detection means or step may be configured in such a manner that the pointing position is detected from the image region of the pointing image having a rod-like shape included in the display region.

The position detection means or step may also be configured in such a manner to capture a rod-shaped image region as the image region of the pointing image, based on the continuous shape of the image region including within the display region, and detect a tip position of the image region as the pointing position.

A presentation system of the present invention comprises:
image display means for displaying an image;
image-acquisition means for acquiring an image of a display region in which an image is displayed;
position detection means for detecting a pointing position from an image region of a pointing image included within the display region based on an image-acquisition signal of the image-acquisition means; and
cursor control means for controlling a position of a cursor included within the image displayed by the image display means, based on the detected pointing position.

A computer useable information embodied on computer-readable medium in this aspect of the present invention comprises:
information for detecting a pointing position of an image region of a pointing image included in a display region, based on an image-acquisition signal of the display region; and
information for controlling a position of a cursor included within an image displayed by an image display means, based on the detected pointing position.

A method in another aspect of the present invention comprises:
an image display step of displaying an image;
an image-acquisition step of acquiring an image of a display region in which an image is displayed;
a position detection step of detecting a pointing position of an image region of a pointing image included within the display region from an image-acquisition signal of the image-acquisition means; and
a cursor control step of controlling a position of a cursor included within the image displayed by the image display means, based on the detected pointing position.

With this aspect of the invention, a presenter can point at any desired position on the display region with a predetermined indication tool, such as a rod-shaped indication tool or a finger, and that pointing position will be detected and the position of a cursor will be controlled. This ensures that the presentation can proceed smoothly.

Note that the indication tool that creates the shadow or actual image of the pointing image is preferably formed to have a slightly larger pointing position at the tip of the rod-shaped indication tool, and a non-reflective material is used to make this pointing position. This ensures that the tip portion of the indicator rod within the acquired image can form a shadow or actual image reliably, and thus the pointing position can be detected more accurately.

The presentation system in accordance with this aspect of the invention controls the position of a cursor displayed on the display region, based on the detected pointing position. This ensures that the cursor moves to follow the position indicated by the presenter so that the pointing position can be displayed in an extremely easy-to-see manner, not only for the presenter but also for the audience watching the presentation. As a result, the presentation can proceed in a form that is natural to both the presenter and the audience, making it possible to implement a presentation system that is convenient to use and also easy to understand.

The above described position detection means, information, or step could be configured in such a manner that a predetermined position of a shadow region of the pointing image included within the display region is detected as a pointing position.

This makes it possible for any pointing position indicated by the presenter within the display region to be detected as a shadow region on the display region.

Alternatively, this position detection means, information, or step could be configured in such a manner that a predetermined position of a real-image region of the pointing image included within the display region is detected as a pointing position.

This makes it possible for any pointing position indicated by the presenter within the display region to be detected as a real-image region on the display region.

Thus when the presenter indicates a certain position with an indication tool such as a rod, this aspect of the invention makes it possible for that pointing position to be detected as a shadow region or real-image region of the indication tool on the display region.

This position detection means, information, or step is preferably configured in such a manner that a rod-shaped image region included within the display region is captured as the image region of the pointing image, and a tip position of the image region is detected as the pointing position.

This ensures that detection targets other than the rod-shaped image region are determined to be noise within all the possible detection targets and thus are not perceived to be the pointing image. This enables accurate pointing position detection that is not affected by factors such as noise and environment conditions.

In addition, the tip of the image region of the rod-shaped pointing image is detected as the pointing position, so that the presentation can proceed with a sensation as if the user is giving the presentation while using a finger or rod to indicate as if with a black plate or the like.

This position detection means, information, or step is also preferably configured in such a manner that a rod-shaped image region is captured as the image region of the pointing image, based on the continuous shape of the image region included within the display region.

This configuration ensures that the pointing image can be reliably separated from noise images comprises within the acquired image, making it possible to detect the pointing position even more reliably.

The cursor control means, information, or step in this aspect is preferably configured in such a manner that a plurality of cursors is displayed simultaneously within the display region and also each cursor position is controlled independently.

Another aspect of the cursor control means, information, or step comprises means, information, or a step for fixedly displaying the cursor at a desired position within the display region.

This configuration ensures that a cursor can be made to move to follow the position indicated by the presenter, so that the audience can perceive the position indicated by the presenter as the position of the cursor, in an easily understandable fashion.

In a still further aspect of the present invention, cursor control is provided for a plurality of pointing images, as described in the example below. Assume, for example, that the pointing position is to be displayed individually for each of the presenter and a participant. When a cursor at the position of the pointing image indicated by the participant (assistant) can be controlled in addition to control over the cursor position indicated by the presenter, they can both see at a glance a location that requires explanation or a location of a question. This makes it possible to implement natural discussions and conferences, enabling highly understandable presentations.

Similarly, when the presenter wishes to compare two locations on the displayed screen-image, the presenter can set a first cursor at the position of a first explanatory point by pointing at it directly, then set the cursor to be fixed at that position and point directly at the location of the comparison point. This enables the audience to see the two marker locations simultaneously, so that the audience can simply search for the two marker locations.

It is also possible to hold the cursor position then return to the presentation smoothly, when the presenter is searching through reference material and thus is separated from the display region and cannot indicate it. This makes it possible to efficiently implement a presentation, without causing the attention of the participants to wander.

A further aspect of this cursor control means, information, or step preferably controls a cursor position to indicate the detected pointing position, at a position having no overlap with the image region of the pointing image.

Thus the position at which the cursor is displayed is located such that it does not overlap the position indicated by the presenter on the display region, so that the pointing position can be conveyed to the audience watching the presentation in an easy-to-understand and accurate fashion.

The above described cursor control means, information, or step may control a cursor size to be displayed according to a tip size of an image region of the pointing image having a rod like shape.

For example, when the tip of the pointing image covering region is small, the pointing position or the cursor can be made easier for the audience to see, by displaying the cursor larger.

A device or system in this aspect of the present invention may comprise:

a screen having the display region,
wherein the image display means comprises an image projection means for projecting an image onto the display region; and
optical means of the image-acquisition means controls image-acquisition conditions in linkage with optical means of the image projection means.

In a computer useable information embodied on computer-readable medium as another aspect of the present invention, information for controlling optical means of the image-acquisition means preferably comprises information for controlling image-acquisition conditions in linkage with optical means forming an image projection means for projecting an image onto the display region.

Ordinarily, the presenter adjusts the focus and zoom of the optical means, such as a lens, of the image projection means while watching the screen-image displayed on the display region. On the other hand, optical adjustment of the image-acquisition means is often done while the presenter is watching the acquired image. With this aspect of the invention, the presenter is released from making these two troublesome adjustment operations by control that links the optical adjustment of the image-acquisition means to the optical adjustment of the image projection means, thus making the system more convenient.

A device or presentation system in this aspect of the present invention preferably comprises:

a display having the display region,
wherein the image projection means is disposed in such a manner as to project an image from in front of or behind the screen.

A front-projection type of presentation system, which projects an image from the front of a screen that is a display region, makes it possible for the presentation to preceded while a large screen image for the presentation is projected onto the screen from the image display means. However, in this case, it is often difficult to touch the screen image directly, or point to a position thereon. In this case too, this aspect of the invention makes it possible for the presenter, who is positioned between the image-acquisition means and the screen, to cause a desired position to be perceived as a pointing position, by creating a shadow on the screen in such a manner as to interrupt part of the light path of the projection means, or by creating an actual image of the indication means within the acquired image in such a manner as to interrupt part of the light path of the image-acquisition means.

Similarly, in a rear-projection type of presentation system, which projects an image from the rear of the display region, the presenter can cause a shadow region or real-image region of a pointing image to appear at a position on the display region indicated by the presenter. Therefore the pointing position can be detected from the shadow or actual image thereof.

A still further aspect of the presentation system in accordance with the present invention comprises:

image display means for displaying an image;
image-acquisition meanas for acquiring an image of a display region in which an image is displayed;
reference-value setting means for setting a reference value for separating an image region of a pointing image included within the display region from an image-acquisition signal of the image-acquisition means;
position detection means for detecting a pointing position from the image region of the pointing image, by comparing the image-acquisition signal and the reference value and thus extracting the image region of the pointing image; and
cursor control means for controlling a position of a cursor included within the image displayed by the image display means, based on the detected pointing position,
wherein the reference-value setting means is configured to be capable of modifying the reference value.

A computer useable information embodied on computer-readable medium for controlling a presentation system, as a still further aspect of the present invention, comprising:

reference-value setting information for setting a reference value for separating an image region of a pointing image included within a display region from an image-acquisition signal of image-acquisition means;

position detection information for detecting a pointing position from the image region of the pointing image, by comparing the image-acquisition signal and the reference value and thus extracting the image region of the pointing image; and cursor control information for controlling a position of a cursor included within an image displayed by image display means, based on the detected pointing position, wherein the reference-value setting information comprises information for modifying the reference value.

As a still further aspect of the present invention, a method of detecting a pointing position for a presentation comprises:

an image-acquisition step of acquiring an image of a display region in which an image is displayed; and a position detection step of comparing an image-acquisition signal with a reference value for separating an image region of a pointing image and thus extracting the image region of the pointing image, then detecting a pointing position from the image region of the pointing image; and a cursor control step of controlling a position of a cursor included within an image displayed by an image display means, based on the detected pointing position, wherein the position detection step comprises a step of modifying the reference value for separating the image region of the pointing image included within the display region from the image-acquisition signal of an image-acquisition means.

This aspect of the invention makes it possible to modify the reference value that is used for separating the image region of a pointing image from an image-acquisition signal. This ensures that the image region of a pointing image that is formed on the display region can be extracted accurately and, as a result, the pointing position can be detected automatically and the position of the cursor can be controlled easily, enabling the presentation to proceed smoothly.

The position detection means, information, or step may be configured in such a manner that a predetermined position of a shadow region of the pointing image included within the display region is detected as the pointing position.

Alternatively, this position detection means, information, or step may be configured in such a manner that a predetermined position of a real-image region of the pointing image included within the display region is detected as the pointing position.

The position detection means, information, or step is preferably configured in such a manner that a rod-shaped image region included within the display region is captured as the image region of the pointing image, and a tip position of the pointing image is detected as the pointing position.

The position detection means, information, or step also preferably captures a rod-shaped image region as the image region of the pointing image, based on the continuous shape of the image region included within the display region.

The device and system in this aspect of the present invention preferably further comprises:

calibration pattern image generation means for displaying a predetermined calibration pattern image from the image display means to the display region, wherein the reference-value setting means automatically sets a reference value for extracting the image region of the pointing image, based on data of the calibration pattern image and the image-acquisition signal.

A computer useable information embodied on computer-readable medium in this aspect of the present invention preferably comprises calibration pattern control information for displaying a predetermined calibration pattern image from the image display means to the display region, wherein the reference-value setting information comprises information for automatically setting a reference value for extracting an image region of the pointing image, based on data of the calibration pattern image and the image-acquisition signal.

More specifically, this calibration pattern image is projected from the image display means towards the display region when the image display means starts operating, or during a mid-operation update.

In this case this time, the reference-value setting means automatically sets the reference value that is used for extracting the image region of the pointing image from the acquired image, based on an image-acquisition signal obtained from the acquisition of an image of the displayed calibration pattern and brightness data for this calibration pattern image. If the image-acquisition signal is a monochrome image signal, for example, the reference value is set automatically to have an optimal margin with respect to the brightness level of black.

In this case, the device and system in this aspect preferably further comprises:

indication means for setting a reference value, wherein when a reference-value setting instruction is input by the indication means:

the calibration pattern image generation means causes the display of a calibration pattern image from the image display means on the display region; and the reference-value setting means automatically sets a reference value for extracting the image region of the pointing image, based on data of the calibration pattern image and the image-acquisition signal.

Even with a presentation system that is used in the same location, the optimal reference value often varies according to factors such as the time at which it is used and the ambient environment. For example, the optimal reference value will differ when the system is used during the day from when it is used at night. Even when the system is used at the same time of day, this optimal reference value will change depending on whether the day is sunny or cloudy.

In addition, if the presentation extends over a long period of time, it can often happen that the ambient brightness will change between the start of the presentation and a point at which a certain amount of time has elapsed, so that the optimal reference value will also change.

In such a case too, this aspect of the invention could be configured in such a manner that a calibration pattern image is displayed onto the display region from the image display means, by using the indication means to specify that the reference value is reset. This ensures that the reference-value setting means automatically resets the optimal reference value on the basis of the image-acquisition signal for this calibration pattern and calibration pattern data.

The reference-value setting means preferably divides the display region into a plurality of regions and sets an individual reference value for each of the divided regions.

In such a case, the calibration pattern image generation means is preferably configured in such a fashion that a predetermined calibration pattern image having a calibration pattern for each of these partial areas is displayed on the display region.

In another aspect of the invention, this display region is preferably divided into at least a corner area that can easily become comparatively dark and a center area that can easily become relatively bright, and an individual reference value is set for each of these partial areas.

In a still further aspect of the computer useable information embodied on computer-readable medium of the present invention, the reference-value setting information preferably comprise information for dividing the display region into a plurality of regions and automatically setting an individual reference value for each of the divided regions.

When a projector is used as the image display means and the display region is curved or the brightness of the black level of the screen image becomes uneven due to variations in the brightness of the projected image, it will be necessary set an optimal reference value to suit each area.

With this aspect of the invention, the image region of the pointing image can be extracted reliably from the acquired image and the pointing position can be detected, even if there are variations in brightness over the display region, by dividing the display region into a plurality of regions and setting an individual reference value for each partial area.

The calibration pattern image generation means preferably displays a predetermined calibration pattern image formed by combining of a plurality of regions having different brightnesses on the display region.

In other words, since it often happens that the calibration pattern displayed from the image display means during the reference value setting process sets black, with the lowest brightness level, as the reference, for example, the entire area of the calibration pattern image could be set to a completely black level. However, when the same black is displayed as an image on the display region, the brightness level obtained by the image-acquisition means when it acquires that black will be slightly different if the surroundings are completely black and if there are areas other than black in the surroundings.

With this aspect, the configuration is such that a calibration pattern image formed of a combination of a plurality of regions having different brightness is displayed and the reference value can be set from this calibration pattern image, in such a manner that the reference value can be set reliably and also to the optimum value even in the above cases. This makes it possible to extract the image region of the pointing image more accurately from the image-acquisition signal, and thus detect the pointing position.

In particular, a suitable value can be set for the reference value for each of the divided region, by a configuration in which a combined pattern of a plurality of regions having different brightnesses is displayed in the display region, as a calibration pattern image set for each divided region.

Yet another aspect of the presentation system of the present invention comprises:

image display means for displaying an image;

image-acquisition means for acquiring an image of the display region; and processing means for detecting a pointing position, based on an image-acquisition signal of the image-acquisition means.

A method of detecting a pointing position for a presentation in a further aspect of the present invention comprises:

an image-acquisition step of acquiring an image of a display region in which an image is displayed; and a step of detecting a pointing position from an image region of a pointing image, based on an image-acquisition signal.

In this case, the processing means or position detection step may be configured in such a manner that the pointing position is detected from a shadow region of the pointing image of the presenter included within the display region.

Alternatively, this processing means or position detection step may be configured in such a manner that the pointing position is detected from a real-image region of the pointing image of the presenter included within the display region.

When the presenter indicates a certain position with a finger or a rod-like indication tool in this aspect of the invention, that pointing position is detected as a region of the shadow or the actual image of the finger or indication tool on the display region, and the pointing position is copied for data processing.

This makes it possible to implement a system that enables a presentation which feels more human, in a form that is particularly natural to both the presenter and the audience.

The processing means or position detection step in this aspect preferably comprises a pointing position detection means or step for detecting the pointing position of the presenter from the region of the rod-shaped pointing image included within the display region.

The processing means or position detection step is preferably further configured to enable the detection of a plurality of the pointing positions included within the display region.

In an even further aspect of the presentation system in the present invention, it is preferable that the image display means comprises an image projection means for projecting an image on a screen, and is disposed in such a manner as to project an image from in front of or behind the screen.

Optical means of the image-acquisition means is preferably configured to enable control of image-acquisition conditions, linked to optical means of the image projection means.

The image-acquisition means is preferably configured in such a manner that the image-acquisition area is freely adjustable with respect to the display region.

This makes it possible to implement a system that is extremely convenient to use, because the image-acquisition area can be seen as required to suit the environment in which it is used.

In this case, it is more preferably to configure the image-acquisition means and the image display means as an integral unit, to increase the convenience of the system.

This image-acquisition means is preferably configured in such a fashion that the image-acquisition direction thereof can be adjusted vertically.

This configuration makes it possible to prevent any distortion of the acquired image caused by the environment in which the image display means and image-acquisition means are used, thus making it possible to detect the pointing position more accurately from the acquired image.

The processing means or position detection step preferably comprises:

cursor control means or a cursor control step, for controlling a cursor position included within the image displayed by the image display means, based on the detected pointing position.

The cursor control means or step is further preferably to display a plurality of cursors simultaneously within the display region and control each cursor position independently.

This cursor control means or step is further preferable to comprise a position-fixing means or step for fixedly displaying the cursor at a desired position within the display region.

The system preferably comprises a polarizing plate which is provided in a light path of the image-acquisition means and absorbs light projected from the image projection means.

In this case, another polarized plate is preferably provided in the light path of the image projection means as well, where this polarized plate has a direction of polarization that differs from that of the polarized plate provided in the light path of the image-acquisition means.

This configuration ensures that the pointing position can be detected with comparatively little adverse effect from the light projected from the image projection means.

The presentation system in this aspect of the present invention preferably comprises illumination means for lighting a low-brightness level region of the display region.

In this case, the illumination means is preferably configured so that the direction of lighting thereof is freely adjustable with respect to the display region, in such a manner that any area having variations in the brightness of the display image caused by factors such as ambient lighting or environmental conditions, such as large corner areas that are affected by shading, can be selectively lit.

This ensures that the effects of shading on the screen can be reduced, making it possible to detect the pointing position more accurately.

The presentation system in this aspect of the present invention could further comprise:

function input means to which a predetermined function is allocated; and means for performing data processing according to a function being input.

This ensures that the presentation can proceed while the presenter uses a mouse to perform an operation that is similar to a screen-image operation, by allocating a function to the left-click or right-click operation of a mouse. For example, a function such as dragging, underlining, or handwriting input could be allocated, so that the presentation can be given while using that function.

In addition, it is possible to use the cursor control means to indicate a plurality of points or enable a detailed discussion in a simple manner, by allocating an instruction for fixing the display of the position at which the cursor is displayed on the display region and another instruction for returning from the fixed display, thus increasing the effectiveness of the presentation.

In this case, when the presenter uses a rod-shaped indication tool for pointing, the function input means could be configured in such a manner that it is formed either integrally with that indication tool or separately from that indication tool, so that the presenter can operate it while holding it in a hand or wearing it on the body.

BRIEF DESCRIPTION OF THE DRAWINGS

FIG. 2A is a schematic view illustrating a rear type of presentation system incorporating a CCD camera of the present invention, and FIG. 2B is an illustrative view of a rear type of presentation system with an attached CCD camera of the present invention;

FIG. 8A is an illustrative view of the step for extracting the shadow of the pointer from the image-acquisition signal of the CCD camera, and FIG. 8B is an illustrative view of specific image processing used for extracting the shadow of the pointer from the image-acquisition signal of the CCD camera;

FIG. 9A is an illustrative view of the step of detecting the pointing position from the extracted shadow of the pointer, and FIG. 9B is an illustrative view of specific image processing need for detecting the pointer position from the extracted shadow of the pointer;

FIGS. 13A and 13B are illustrative views of shading countermeasures used in the present invention;

FIG. 20 is a detailed flowchart of the operation of fixing the display of the cursor position in the present embodiment;

DESCRIPTION OF THE PREFERRED EMBODIMENT

A preferred embodiment of a presentation system to which the present invention is applied is described in detail below, with reference to the accompanying drawings.

1. Overall Description

Figure 1:
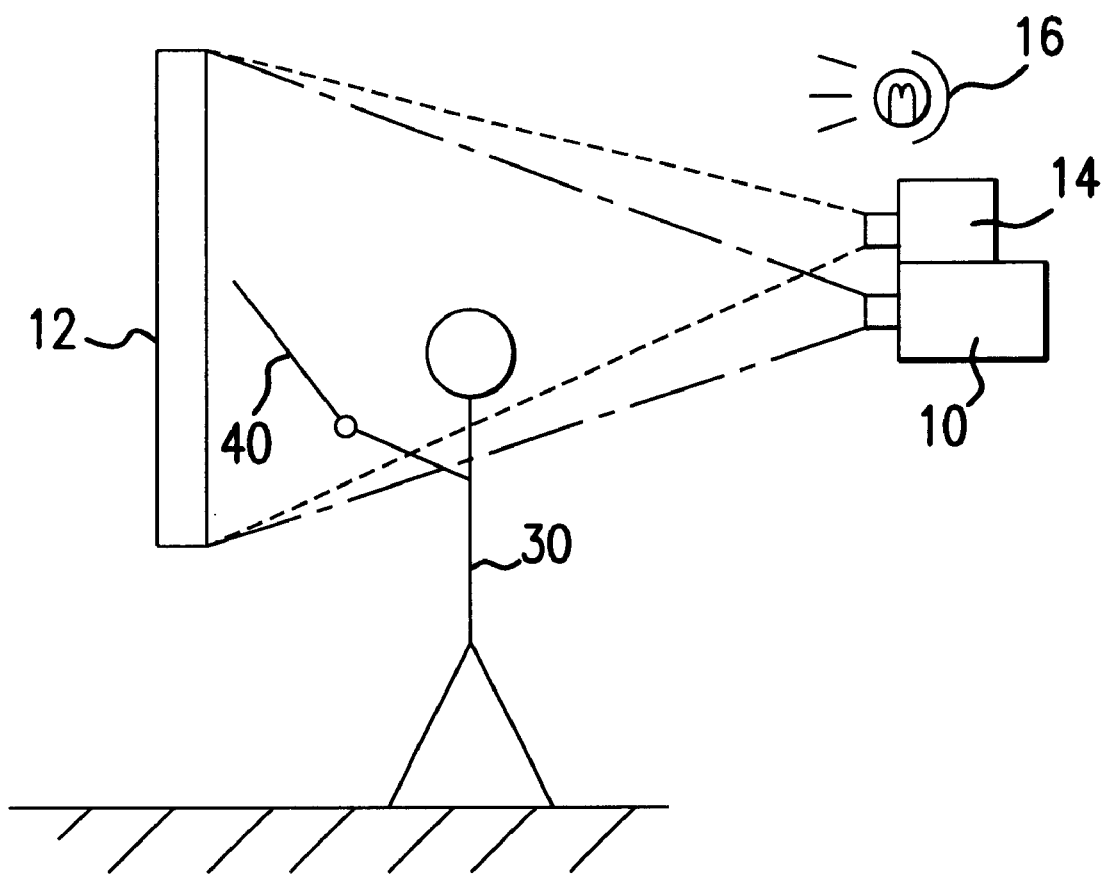
FIG. 1 is a schematic view illustrating a front type of presentation system of the present invention.

An example of a presentation system that uses a front-projection type of projector apparatus as an image display apparatus is shown in FIG. 1. A predetermined image for a presentation is projected from a projector 10 that is provided substantially facing a screen. A presenter 30 gives a presentation to spectators while using an indicator rod 40 to indicate desired positions of the image in the display region 12, that is a region on the screen on which the image is displayed.

An example of the presentation given by the presenter 30 is shown in FIG. 4.

Figure 4A:
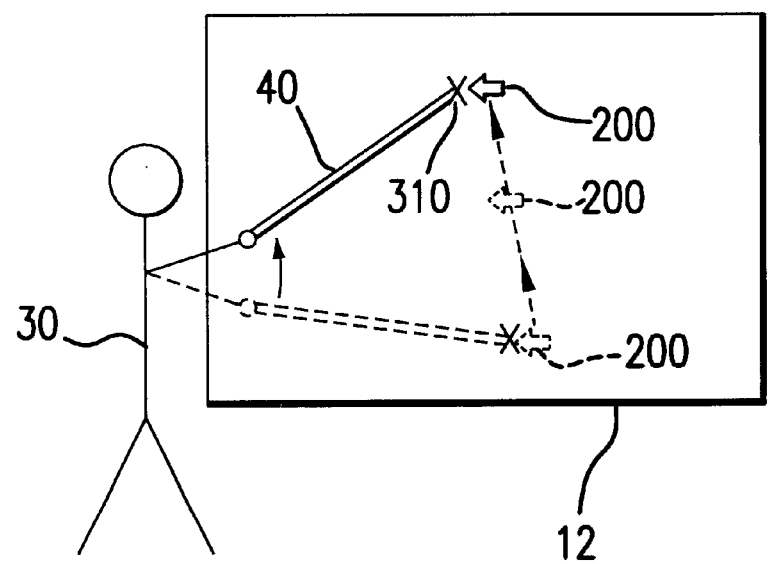
FIG. 4A is an illustrative view of a presentation.
Figure 4B:
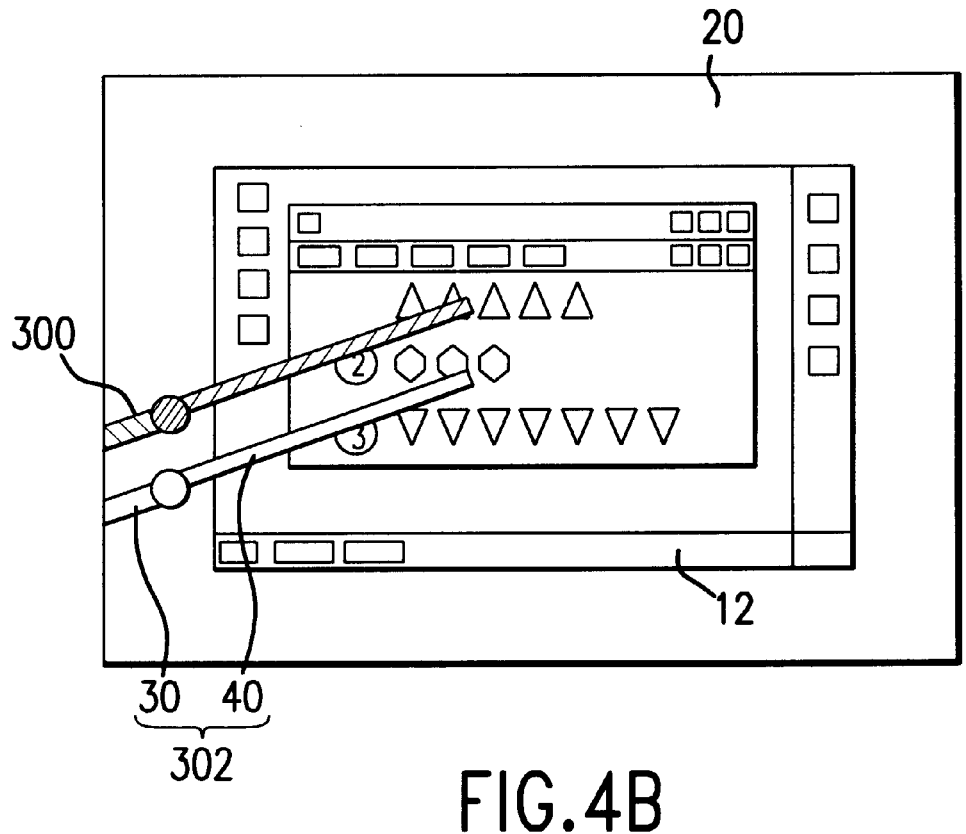
FIG. 4B is an illustrative view of the shadows of the presenter and the indicator rod and the actual image of the indicator rod within an image that is acquired during this presentation.

When the presenter 30 indicates a desired position of the display region 12 on the screen using the indicator rod 40, as shown in FIG. 4A, the display region 12, the indicator rod 40, and part of the presenter 30 are acquired as an acquired image 20 shown in FIG. 4B by a CCD camera 14, which is provided substantially facing the display region 12 and which functions as an image-acquisition means.

In this case, a long, narrow rod-shaped shadow that is formed by the indicator rod 40 as it interrupts the projected light from the projector 10 is called a shadow region 300 of the pointing image. An actual image of part of the presenter 30 and the indicator rod 40 that appear within the acquired image 20 is called a real-image region 302 and, when combined with information (target) used for detecting the pointing position, it is called a detection target 304.

The pointing position on the display region 12, which the presenter 30 indicates by using the shadow region 300 of the indicator rod 40, is detected as a tip position 310 of the shadow region 300 of the pointing image that appears on the display region 12 in the acquired image 20. In other words, the tip position 310 of the shadow region 300 of the rod-shaped pointing image is automatically detected as the pointing position, and is subjected to predetermined data processing.

In a similar manner, the pointing position on the display region 12, which the presenter 30 indicates by using the real-image region 302 of the indicator rod 40, is detected as a tip position 310 of the real-image region 302 of the pointing image that appears on the display region 12 in the acquired image 20.

With the present embodiment, data processing is performed so that a perceived pointing position is indicated by a cursor 200 projected from the projector 10. In other words, in the display image projected onto the display region 12, the cursor 200 that is comprised within that image moves to follow the pointing position of the indicator rod 40. Thus the audience who are listening to the presentation of the presenter 30 are able to perceive the pointing position accurately and also easily, from the position of the cursor 200 displayed on the display region 12.

Note that corner portions of the display region 12, particularly the four corner portions thereof, has a brightness level that is lower than that of a central portion, as will be discussed later. To ensure that the shadow and actual image of the indicator rod 40 can be detected accurately, even in such regions, a light source 16 is used to add supplementary lighting to those corner portions of the display region 12.

An example of a rear-projection type of presentation system is shown in FIG. 2A. In this presentation system, the image from the projector 10 is projected from behind the display region 12, and that projected image is acquired by using the CCD camera 14 which is provided behind the display region 12 and which functions as image-acquisition means. The image from the projector 10 is projected via reflective plates 18-1 and 18-2 onto the display region 12.

Another example of a rear-projection type of presentation system is shown in FIG. 2B, wherein the image of the display region 12 is acquired by the CCD camera 14 that is provided on the outer side, substantially facing the screen.

In this type of rear-projection system as well, the presenter 30 indicates a desired position on the display region 12 with the indicator rod 40, and the shadow and actual image of that indicator rod 40 appear within the acquired image 20. The thus appearing shadow can be acquired by the CCD camera 14 as the shadow region 300 of the pointing image and the actual image thereof can be acquired as the real-image region 302 of the pointing image.

The tip portion 310 of the shadow region 300 or the real-image region 302 of the pointing image is automatically perceived as the pointing position, and data processing is applied thereto as described above.

In addition to the projector 10 which is the above described projector type of display apparatus, various other types of display apparatuses could be used as the image display means of the rear-projection type of system to which the present invention is applied, such as a direct-viewing type of CRT, a direct-viewing type of liquid crystal display panel, a plasma display panel, or other display apparatus.

Figure 3:
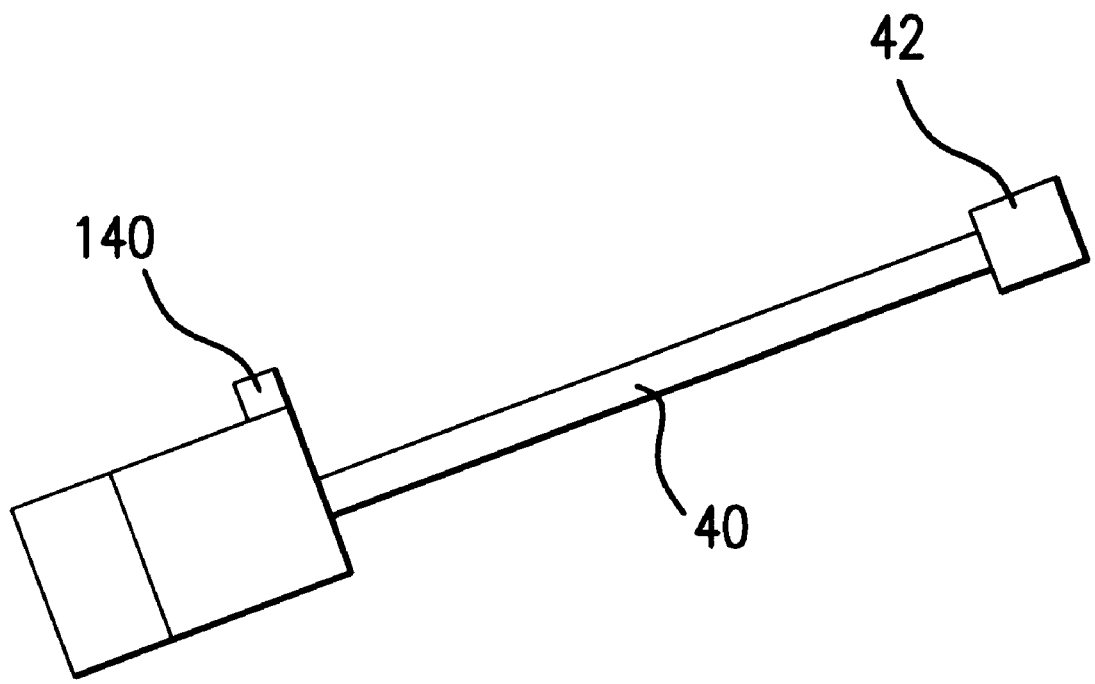
FIG. 3 is an illustrative view of an example of an indicator rod used in the present invention.

A specific example of the indicator rod 40 is shown in FIG. 3. The indicator rod 40 used in the present invention is provided with a wide pointing portion 42 at the tip of a rod-shaped portion thereof. This pointing portion 42 is made of a material having a low reflectance. Since light is not reflected from the tip of the indicator rod in this implementation, a clear detection target 304 of the pointing image can be formed within the image-acquisition area and, as a result, it is possible to reliably detect the pointing position from the image-acquisition signal of the CCD camera 14.

Note that in the front-projection type of system shown in FIG. 1, the presenter 30 can form the shadow region 300 of the pointing image within the acquired image 20 of the CCD camera 14 by positioning the indicator rod 40 in the light path between the projector 10 and the display region 12, without bringing the indicator rod 40 into contact with the display region 12 directly. Similarly, the presenter 30 can form the real-image region 302 of the pointing image within the acquired image 20 by positioning the indicator rod 40 in the light path between the display region 12 and the CCD camera 14, without bringing the indicator rod 40 into contact with the display region 12 directly. This means that the presenter 30 can give the presentation from a position that is comparatively far from the display region 12, while still being able to indicate any desired position on the display region 12.

Figure 5:
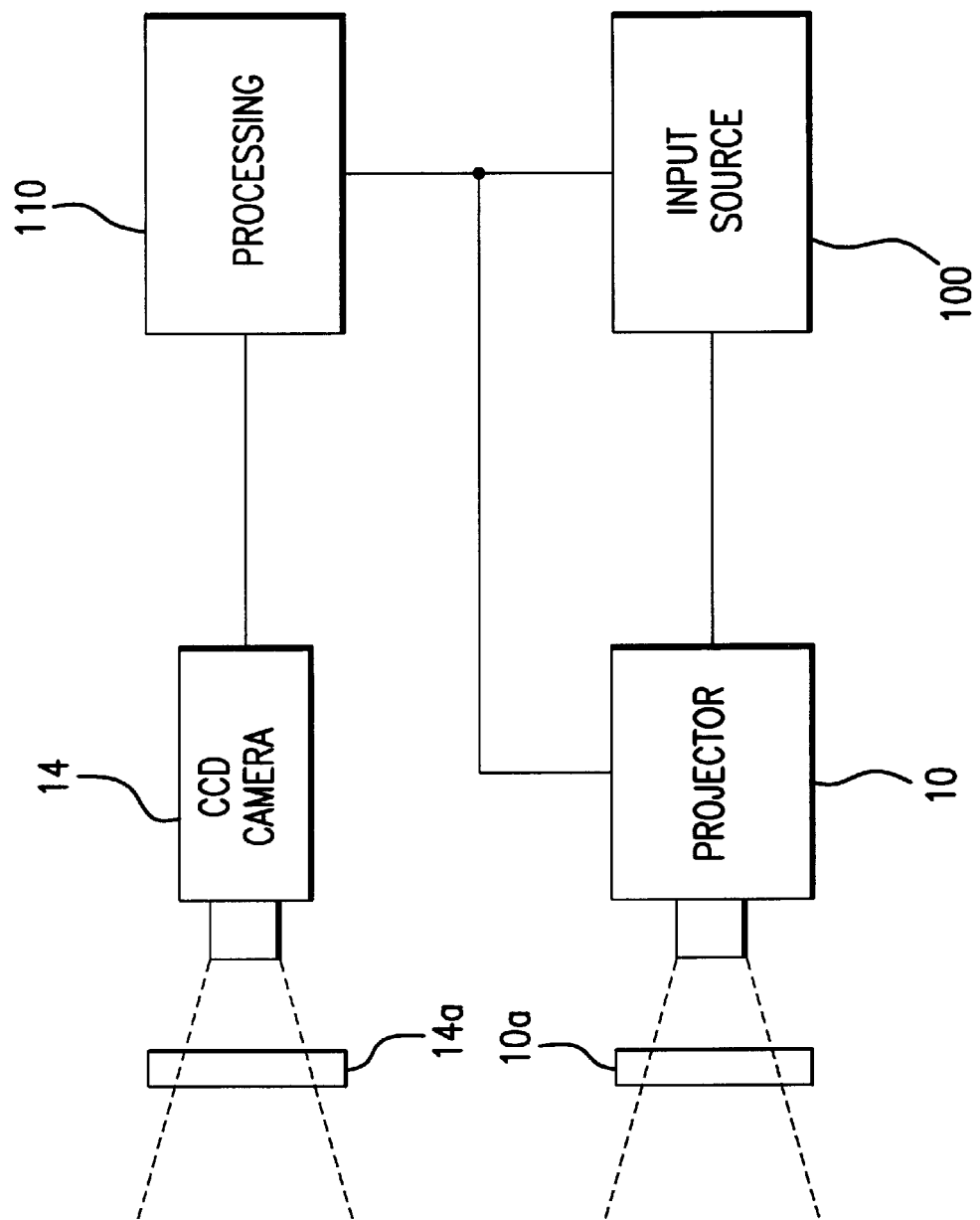
FIG. 5 is an functional block diagram of the system of the present embodiment.

A schematic functional block diagram of the system of the present embodiment is shown in FIG. 5.

The system of the present embodiment comprises an input source 100 that supplies an image to the projector 10 and a processing section 110 that automatically detects the pointing position from the image acquired by the CCD camera 14. Note that further details of the configuration of this processing section 110 will be given later.

In the present invention, the projector 10 and the CCD camera 14 are formed as an integral unit, but they could equally well be disposed separately. When they are disposed separately and a presentation is given with an enlarged screen image, particularly in a dedicated conference chamber or hall, this makes it possible to use existing equipment that is provided within the chamber, so that it can be freely modified in accordance with the types of devices, their locations, and the surrounding environment, increasing the commonality and convenience of use of the system.

The configuration is such that the size and direction of images projected from the projector 10 can be freely set as required and the image-acquisition area of the CCD camera 14 can also be freely set as required.

Polarized plates 10a and 14a are provided in the light paths of the projector 10 and the CCD camera 14, respectively, to ensure that the CCD camera 14 can capture a clear image of the detection target 304 of the pointing image formed by the indicator rod 40 of the presenter 30. These polarized plates 10a and 14a are set in such a manner that the directions of polarization thereof are different from each other. This ensures that the CCD camera 14 is not greatly affected by the light emitted from the projector 10, thus enabling it to reliably acquire the detection target 304 of the pointing image from the acquired image information.

The CCD camera 14 also has a zoom function that enables magnification or compression of the image-acquisition area, making it possible to free set this area to be greater or smaller than the display region 12.

Since this makes it possible to set the image-acquisition area freely in accordance with factors such as the usage environment or the image-acquisition circumstances, it makes the system extremely convenient to use. When the image-acquisition area is set to be greater than the display region, it will no longer be necessary to adjust the position of the image-acquisition area relative to the display region.

In particular, it is possible to take the position of the presenter 30 into consideration and thus detect the pointing position in a more suitable manner, by setting the image-acquisition area so that it includes the presenter 30.

The resolution of the CCD camera 14 can be increased substantially by setting the image-acquisition range to be smaller, so that the area specified for display on the display region 12 can be acquired at a higher resolution to facilitate desired image processing.

2. Detection of Pointing Position

Figure 6:
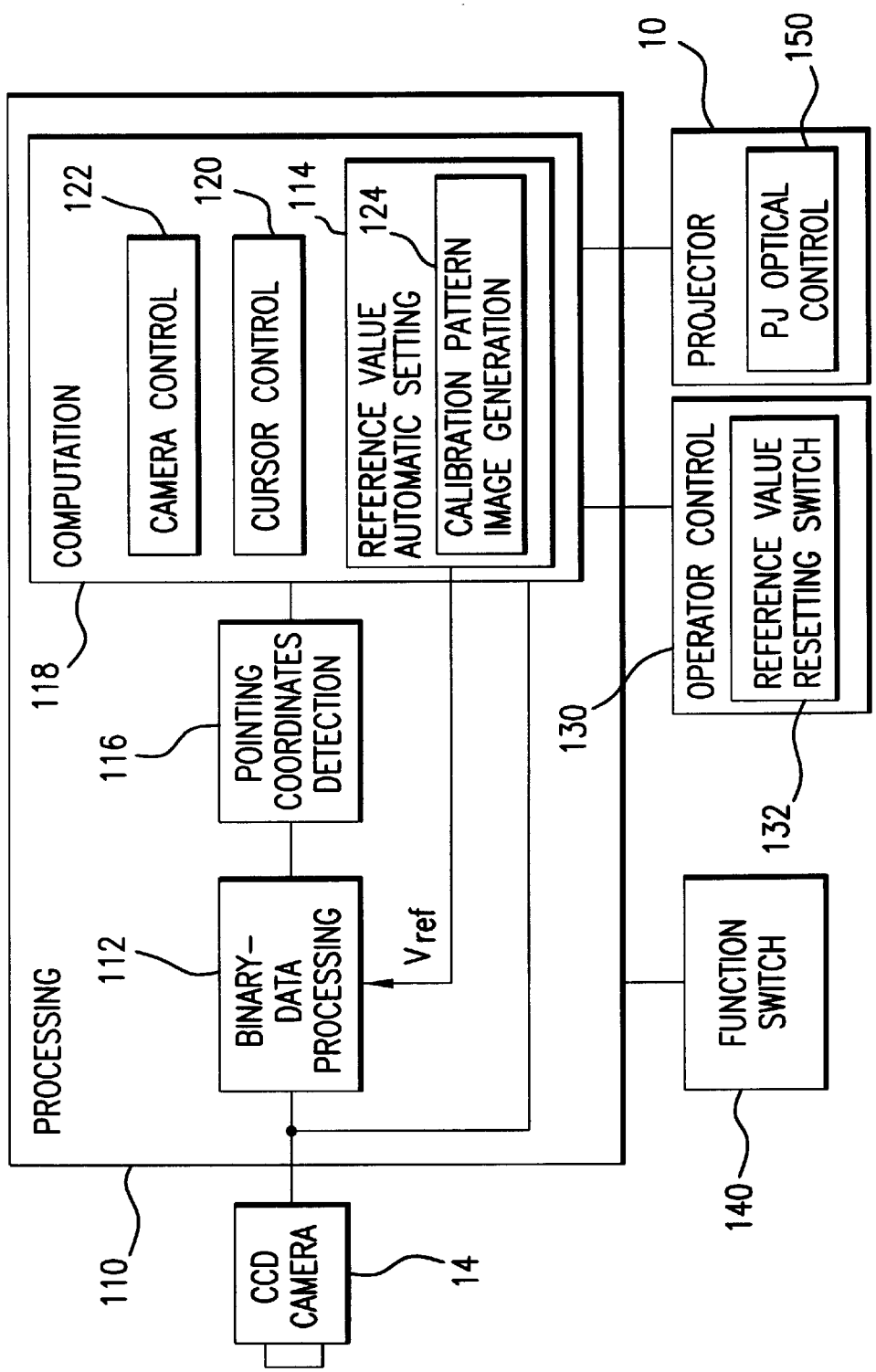
FIG. 6 is a detailed functional block diagram of the system of the present embodiment.

A detailed function block diagram of the processing section 110 is shown in FIG. 6.

In the present embodiment of the invention, the processing section 110 comprises a binary-data processing section 112, a pointing coordinates detection section 116, and a computation section 118. This processing section 110 could be implemented by using components such as a CPU, ROM which is an information storage medium that contains programs and data, and RAM that functions as a work area.

The image signal that is output from the CCD camera 14 is input to the binary-data processing section 112. In the present embodiment, the CCD camera 14 is designed to output a monochrome image-acquisition signal.

In the present embodiment, the binary-data processing section 112 compares the image-acquisition signal and a reference value $V_{ref}$, then extracts the detection target 304 such as the shadow and actual image of the pointing image from the acquired image, and the pointing coordinates detection section functions as a position detection means for detecting the pointing position.

The binary-data processing section 112 also performs processing to compare brightness data of the image-acquisition signal that is output from the CCD camera 14 against the reference value $V_{ref}$ for binary data, and extract the detection target 304 of the pointing image from within the image acquired by the CCD camera 14, then it outputs the processing data as binary image data to the pointing coordinates detection section 116.

The pointing coordinates detection section 116 extracts the bulk of the detection target 304 from the binary image data that has been output from the binary-data processing system 112, detects the tip portion of this detection target 304 as the coordinates of the point indicated by the indicator rod 40, then outputs the result of this detection to the computation section 118.

In the present embodiment, the pointing coordinates detection section 116 is configured in such a manner that the pointing image is specified on the basis of this continuous shape of the image of the detection target 304 extending in a rod shape, and a tip portion thereof is detected as the pointing coordinates. This makes it possible to increase the accuracy with which the pointing position is detected, in comparison with the case in which an angle of the image of the detection target 304 is simply detected as the pointing coordinates.

This is described in detail below.

Figure 7A:
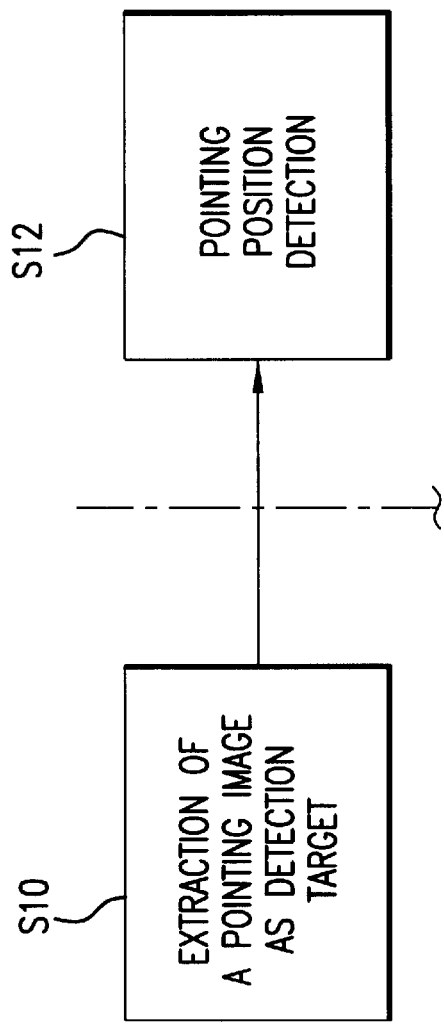
FIG. 7A is an illustrative view of the steps of extracting a shadow of a pointer from the image-acquisition signal of the CCD camera and detecting a pointing position.

A flowchart illustrating the concept of the pointing coordinates detection processing performed by the pointing coordinates detection section 116 is shown in FIG. 7A. In the present embodiment of the invention, the description particularly concerns detection processing in which the shadow region 300 of the pointing image is used as the detection target 304 of the pointing image, but the present invention is not limited thereto and thus a similar processing method can be applied for the real-image region 304 of the pointing image, by extracting a low-brightness region within the acquired image 20.

First of all, processing is done to specify the shadow region 300 of the rod-shaped pointing image, from the binary image data that is output from the binary-data processing section 112. In other words, the shadow region 300 of the pointing image, which is the presenter's shadow 30a and the shadow of the indicator rod 40 as shown at ① in FIG. 7B, is comprised within the binary image data that is output from the binary-data processing section 112.

Figure 7B:
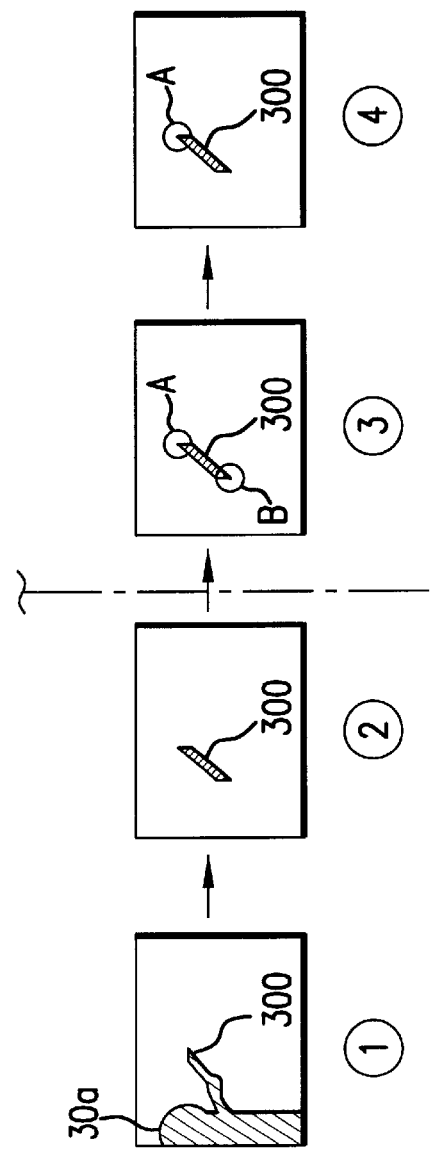
FIG. 7B is an illustrative view of the image processing done for extracting the shadow of the pointer from the image-acquisition signal of the CCD camera and detecting the pointing position.

In step S10, the pointing coordinates detection section 116 extracts the shadow region 300 of the pointing image alone from the binary image data, as shown at ② in FIG. 7B. This extraction processing is performed by extracting the shadow image portion that forms a continuous rod shape, from the binary-data image shown at ① of FIG. 7B.

The pointing coordinates detection section 116 then performs the pointing position detection processing of step S12. In other words, this processing specifies where the pointing position is within the rod-shaped shadow region 300 of the pointing image that was extracted at ② of FIG. 7B. That is to say, processing is done to determine which of points A and B at either end of the shadow region 300 of the rod-shaped pointing image, as shown at ③ in FIG. 7B, is the pointing position.

In this case, the binary image data that has been input from the binary-data processing section 112 comprises the presenter's shadow 30a continuing from the B side of the shadow region 300 of the pointing image, as shown at ① in FIG. 7B. Thus point A, which is not connected to the presenter's shadow 30a, is specified as the pointing position. This means that the coordinates tip of the shadow region 300 of the rod-shaped pointing image, in other words, the coordinates of point A, are detected as the pointing position that is output to the computation section 118.

When binary image data that represents the shadow region shown in FIG. 7B is obtained by the binary-data processing section 112, the processing in accordance with the present embodiment of the invention is such that first of all the rod-shaped shadow image portion is extracted as the shadow region 300 of the pointing image, in step S10, then a specification is made as to which of the two ends of the thus extracted shadow region 300 of the pointing image is the pointing position, in step S12, and the coordinates of that pointing position are detected. This configuration makes it possible to increase the accuracy with which the pointing position is detected from the binary image data that is output from the binary-data processing section 112, in comparison with the case in which a corner portion of the shadow is specified as the pointing position.

The processing of steps S10 and S12 is described in detail below.

2-1. Details of Step S10

A specific example of the processing of step S10 that is shown in FIG. 8 is an example of the algorithm used for extracting the shadow region 300 of the pointing image from the binary image data that is output from the binary-data processing section 112.

In this case, the extraction of the shadow region 300 of the rod-shaped pointing image is considered to be equivalent to the extraction of a long, narrow shape.

the long, narrow shadow is first detected, then the area of that long, narrow shadow is detected. A region where the area is large is perceived to be continuous, and that is extracted as the shadow region 300 of the pointing image. This is described in detail below.

First of all, when binary image data 400 as shown in FIG. 8B is input from the binary-data processing section 112, the pointing coordinates detection section 116 starts the extraction of the shadow region 300 of the pointing image (step S20).

This binary image data 400 comprises the presenter's shadow 30a and the shadow region 300 of the pointing image, which is the shadow of the indicator rod 40, as previously described.

HPF processing is performed in each of the horizontal end vertical directions on this binary image data 400, in steps S22 and S24. Here, HPF processing means a processing that excludes shadow portions having at least a certain length, in both the horizontal and vertical directions.

The images obtained by the processing of steps S22 and S24 are synthesized in step S26 to obtain binary image data 402 from which the presenter's shadow 30a has been removed. In other words, only shadow images that have narrow portions in either the horizontal direction or the vertical direction remain, and all other shadow images have been removed.

LPF processing, which is a processing that removes shadows having a certain length or less, is performed on the thus obtained binary image data 402 in step S28, to obtain labeling-target binary image data 404. This completely removes any fine noise 440.

Steps S30, S32, and S34 remove any detection noise 450 in a region other than the shadow region 300 of the pointing image, which was not removed by step S28. This removal of the detection noise 450 first involves the labeling processing in step S30, then an area is calculated for each label in step S32, and shadows greater than a certain area are extracted in step S34.

In other words, a group of each of the detection noise 450 included within the labeling-target binary image data 404 is separated for each region, these groups are labeled A to E in this figure, and thus labeling processing data 406 is obtained.

The number of pixels is counted for each label (area). In practice, this can be done simultaneously with the labeling. This calculates the area of each shadow region for labels A to E. Any label with a small area is determined to be noise and is removed from the labeling processing data 406, to obtain binary image data 408 that comprises only the shadow region 300 of the pointing image. Note that step S34 could be such that it extracts the label having the largest area. Alternatively, when a plurality of pointing positions are to be detected, as will be described later, it could extract the label with the largest area then the area having the next largest area.

As an extraction method other than the area calculation of step S32, the shadow region 300 of the pointing image could be extracted from a continuous rod-shaped label. When the shape of the thus extracted labeling processing data 406, is a rod shape and it is also continuous, it can be identified as being the shadow generated by the indicator rod 40. However, when there is determined noise 450 that is small and is not continuous, that is determined to be detection noise in the binary image data that has not been removed by the various filters of steps S22, S24, and S28. The presenter's shadow 30a and noise are removed from the binary image data 400 that is output from the binary-data processing section 112 by this series of processes from step S20 to step S36, so that only the shadow region 300 of the long, thin pointing image is extracted thereby and thus the binary image data 408 can be obtained.

Note that when there is little noise in the binary image data 402 that has been subjected to MPF processing, step S28 will not be necessary.

2-2. Details of Step S12

A specific algorithm illustrated in FIG. 9 is used for determining the pointing position from the shadow region 300 of the pointing image comprised within the binary image data 408 obtained by steps S20 to S36.

This processing searches for the most angular part of the shadow region 300 of the pointing image, as the pointing coordinates. Alternatively, even if there is a certain width at the tip of the shadow region 300 of the pointing image, such the most angular coordinates could be specified as the pointing coordinates.

When this processing starts (step S40), points A and B at the two longitudinal ends of the shadow region 300 of the pointing image comprised within the binary image data 408 are detected in step S42, as shown by ① in FIG. 9B. A specific example of this detection will be described later with reference to FIG. 10.

Next, step S44 determines whether or not the image of the shadow that is not the shadow region 300 of the pointing image is in contact with or close to point B.

When the answer is Yes, point B of the binary image data 400 that has been output from the binary-data processing section 112 (the binary image data before it is subjected to the processing of steps S22 to S34) is connected to the presenter's shadow 30a, as shown at ② in FIG. 9B. Therefore, in this case, point A at the opposite end is searched for as the pointing coordinates.

Alternatively, when the answer obtained in step S44 is No, the next step S46 determines whether or not point B is at the edge of the screen image or in the vicinity thereof, such as in binary image data 410 shown at ③ in FIG. 9B. In ③ of FIG. 9B, the presenter 30 is assumed to be pointing with a long indicator rod at a certain position on the display region from outside a screen image 410. In such a case, point B of the shadow region 300 of the pointing image is at the edge of the screen image, so point A at the opposite end thereof is searched for as pointing coordinates A.

Alternatively, when the answer obtained in step S46 is No, the next step S48 determines whether point A is touching a shadow outside the shadow region 300 of the pointing image, or is close thereto. In this case, when the answer is Yes, point B is searched for as the pointing position. When the answer is Yes in this case, point B is searched for as the pointing position; when it is No, a detection error is output.

As described above, the processing of steps S44 and S46 of the present embodiment of the invention can detect the pointing position accurately when the presenter 30 is standing on the left side when facing the display region 12, and the processing of steps S48 and S50 can detect the pointing position accurately when the presenter 30 is standing on the right side when facing the display region 12. In this manner, the processing determines which of points A and B at the two ends of the shadow region 300 of the pointing image is the pointing position, and detects the two-dimensional coordinates (x, y) of that pointing position.

2-3. Details of Step S42

Figure 10A:
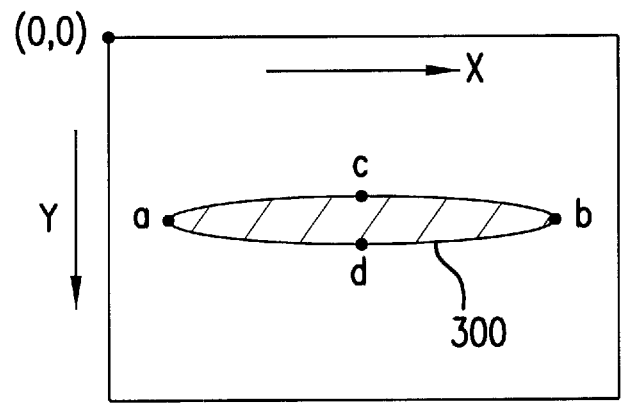
FIG. 10A is an illustrative view of binary image data of the shadow region of a pointing image that is facing in the lateral direction.
Figure 10B:
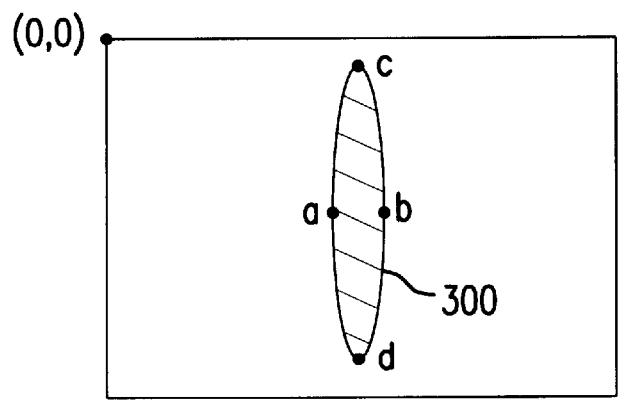
FIG. 10B is an illustrative view of binary image data of the shadow region of a pointing image that is facing in the vertical direction.
Figure 10C:
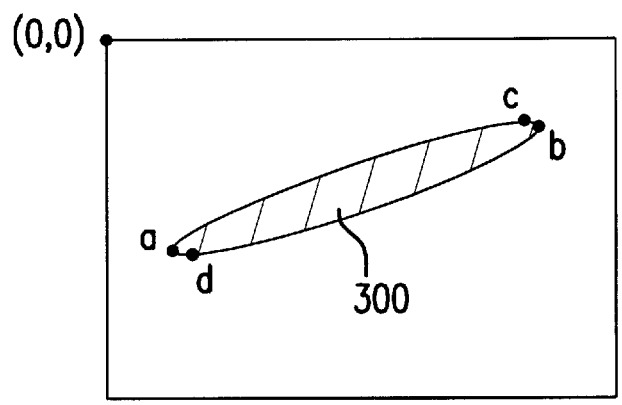
FIG. 10C is an illustrative view of binary image data of the shadow region of a pointing image that is facing in an oblique direction.

A specific example of the processing of step S42 of FIG. 9 is shown in FIG. 10. In this case, three sets of binary image data comprising the shadow region 300 of the pointing image are shown. FIG. 10A shows the shadow region 300 in a lateral orientation, FIG. 10B shows it in a vertical orientation, and FIG. 10C shows it in an oblique orientation. The shape and dimensions of the shadow region 300 of the pointing image vary in accordance with the form of the indicator rod 40 that is used. The shape of the shadow region 300 of the pointing image could be any of rounded, rectangular, or polygonal, by way of example, but the example used for the present embodiment of the invention is a long, thin oval shape.

To search for the two ends of the shadow region 300 of this pointing image, first of all the coordinates of the top left of the display region 12 are taken to be the origin (X, Y)=(0, 0), as shown in FIG. 10, then the x and y coordinates of the shadow region 300 of the pointing image within the image are checked to find the four smallest and largest points (the points having the most extreme coordinates, that is, the points that have no detected coordinates beyond them in any direction) are obtained as a, b, c, and d.

a: (Xmin, Ya)
b: (Xmax, Yb)
c: (Xc, Ymin)
d: (Xd, Ymax)

If a, b, c, and d satisfy the condition:

(Xmax−Xmin)>(Ymax−Ymin)

the points a and b are specified as points A and B at the two ends of the shadow region 300 of the pointing image in step S42. If a, b, c, and d satisfy the condition:

(Xmax−Xmin)<(Xmax−Ymin)

the points c and d are specified as points A and B at the two ends of the shadow region 300 of the pointing image.

Therefore, if the shadow region 300 of the pointing image shown in FIG. 10 is taken as an example, the coordinates of a and b are detected as end points in the longitudinal direction in FIGS. 10A and 10C, and the coordinates of c and d are detected as end points in the longitudinal direction in FIG. 10B.

Note that the pointing coordinates detection section 116 of the present invention usually detects the latest indication position as the pointing position, based on time-series data of the indication using the indicator rod 40, then outputs the resultant detection position data.

Thus the pointing coordinates detection section 116 of the present embodiment detects the coordinates of the tip of the shadow region 300 of the pointing image as the pointing position and outputs data on that detection position to the computation section 118.

Note that, although the above described embodiment extracts the portion of the indicator rod 40 that casts a shadow in the acquired image 20 on the display region 12 as the shadow region 300 of the pointing image, and detects the pointing position therefore, other indication portions such as the shadow cast by the finger of the presenter 30 could equally well be perceived as the shadow region 300 of the pointing image, so that the tip position of the finger could be automatically perceived as the pointing position.

In addition, although the above described embodiment outputs a monochrome image signal from the CCD camera 14 and uses the binary-data processing section 112 and the pointing coordinates detection section 116 to separate the shadow region 300 of the pointing image from this image signal and thus detect the pointing position, a method similar to that of the above embodiment could be used even if a color image-acquisition signal is output from the CCD camera 14, such that the brightness level of the image-acquisition signal is compared with a reference value $V_{ref}$ to extract the shadow of the pointing image and thus detect the pointing position.

2-4. Shading Countermeasures

Depending on the environment in which the presentation system is used, it can happen that a low-brightness region 320a having a brightness level lower than that of other regions is formed in a part of the image projected onto the display region 12, particularly in a corner portion thereof. If this image is acquired by the CCD camera 14 and subjected to binary-data processing by the binary-data processing section 112, a low-brightness region 320b shown in FIG. 13B will be extracted as a shadow. This makes it difficult to detect the pointing position accurately, particularly when the shadow region 300 of the pointing image overlays the low-brightness region 320b.

To solve this problem, the system of the present embodiment of the invention uses an illumination means 16 consisting of a light or LED array, to concentrate the lighting on the low-brightness region 320a having a brightness level that is low within the display region 12. This ensures that the portion within the binary-data image processed by the binary-data processing section 112 that corresponds to the low-brightness area 320a is removed, making it possible to extract the shadow region 300 of the pointing image easily from this binary image data and thus detect the pointing position.

3. Data Processing Based on Detected Position Data

The computation section 11B shown in FIG. 6 performs data processing the image processing, based on detection data for the pointing position that is input thereto.

In the present embodiment of the invention, this computation section 118 functions as a camera control section 122, a cursor control section 120, and a automatic reference value setting section 114.

3-1. Details of Camera Control Section 122

The camera control 122 performs various kinds of optical control, such as focus control for the CCD camera 14, based on information that is input from an operator control section 130 or a projector (PJ) optical control section 150 of the projector 10. The description now turns to optical control based on information that is input from the PJ optical control section 150 of the projector 10, in particular.

A method shown in FIG. 22 provides automatic adjustment of the optical system of the image-acquisition lens of the CCD camera 14, linked to various adjustments such as focus and zoom in the projection lens of the projector 10.

Figure 22B:
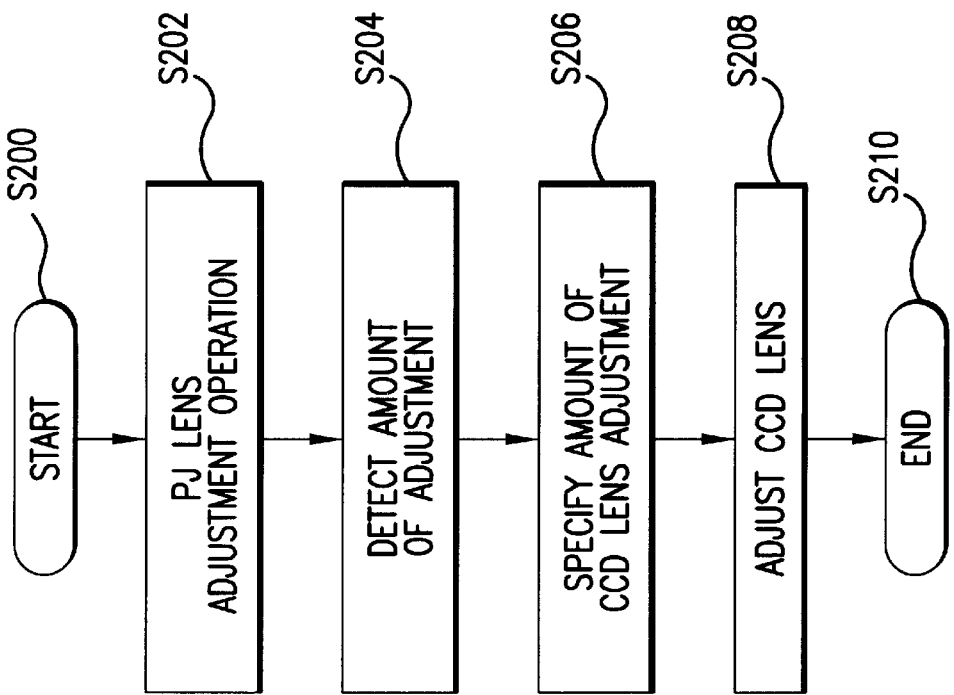
FIGS. 22A and 22B are a block diagram illustrating the automatic setting operation of the optical control section of the CCD camera in the present embodiment.
Figure 22A:
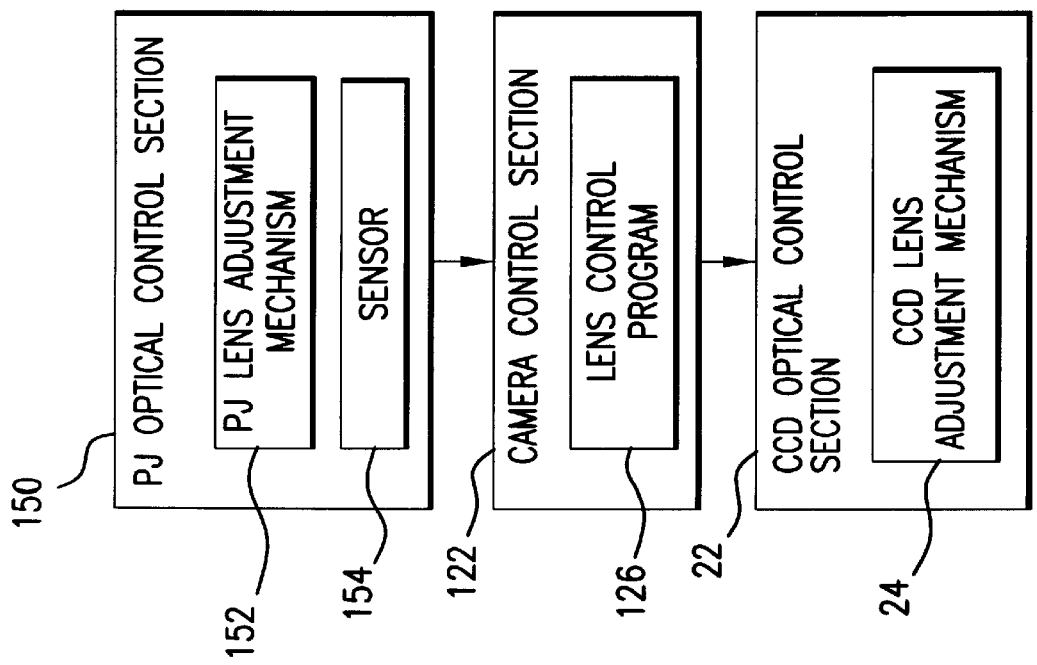

A block diagram illustrating the overall configuration is shown in FIG. 22A.

Ordinarily, the presenter 30 manually adjusts a PJ lens adjustment mechanism 152 that is an optical adjustment mechanism for the projection lens of the projector 10 to ensure that the focus of the display image projected from the projector 10 is optimized, or an automatic adjustment mechanism is used to adjust it automatically. The amount of adjustment of this PJ lens adjustment mechanism 152 is detected by a sensor 154 and is input to the camera control section 122.

The camera control section 122 executes a previously written lens control program 126 for controlling the amount of optical adjustment of the CCD lens, based on the detection data from the sensor 154. The execution result is supplied to a CCD optical control section 22 within the CCD camera 14, and this CCD optical control section 22 controls a CCD lens adjustment mechanism 24 that adjusts the image-acquisition lens. This makes it possible to link the control of the projection lens of the projector 10 to the adjustment of the image-acquisition lens of the CCD camera 14.

Although it was necessary in the prior art to adjust the lenses of the projector 10 and the CCD camera 14 separately, the configuration of the present embodiment allows the presenter 30 to adjust the projection lens of the projector 10 manually or activate an operation that enables automatic adjustment to perform fine optical adjustment of the CCD camera 14 automatically, thus making it possible to remove the troublesome labor involved with fine optical adjustment of the CCD camera 14, improving the operability and ease of use of the system.

The flow of the processing shown in FIG. 22A is shown in FIG. 22B in algorithm form.

First of all, the PJ lens adjustment mechanism 152 is manipulated by the user in step S202, and the amount of that adjustment is detected by the sensor 154 (step S204). The amount of control in the CCD lens adjustment mechanism 24 is searched for by the lens control program 126, based on the amount of adjustment detected by the sensor 154 (step S206), and the adjustment mechanism of the CCD lens is automatically controlled in step S208.

The cursor control section 120 controls the position of the cursor 200 in such a manner that it indicates the detected pointing position. In other words, the input source 100 is controlled in such a manner that the cursor 200 comprised within the image projected from the projector 10 follows the pointing position of the indicator rod 40.

The automatic reference value setting section 114 performs processing for automatically setting to an optical value a reference value $V_{ref}$ for binary data used by the binary-data processing section 112.

The description now turns to details of the cursor control section 120.

3-2. Details of Cursor Control Section 120

The cursor control section 120 controls the position of the cursor 200 in such a manner that it indicates the detected pointing position, at a position which does not overlay the shadow region 300 of the pointing image.

Figure 11A:
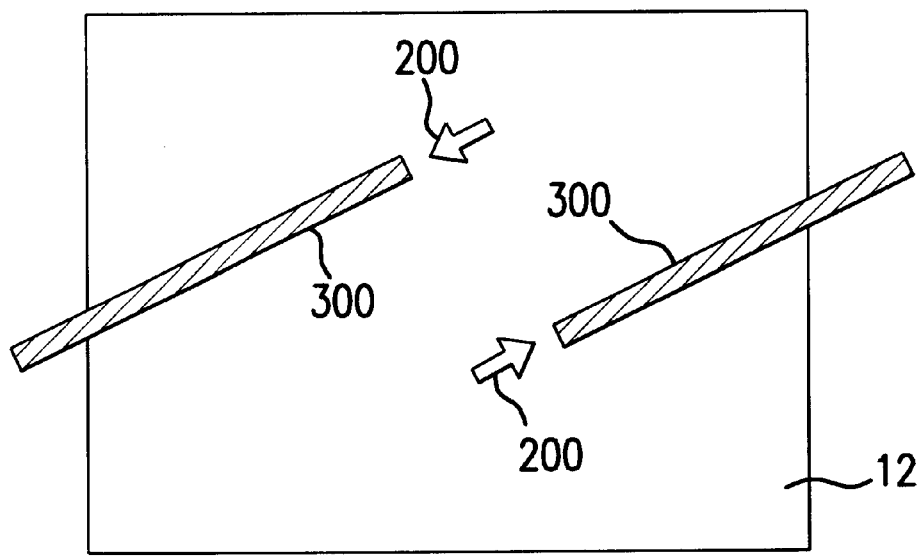
FIG. 11A is an illustrative view of an ordinary cursor display based on the pointing position.

An example of positional control of the cursor 200 is shown in FIG. 11A. In this example, the display portion of the cursor 200 is controlled to a position that is a fixed distance away along a line extending from the shadow region 300 of the pointing image. More specifically, the continuous shape of the shadow region 300 of the pointing image, which is the shadow of the indicator rod 40, is perceived and the cursor 200 is controlled so that it is positioned on a line extending therefrom.

During this time, the cursor 200 appears at a position such that it does not overlay the indicator rod 40, such as at a position that is separated from the tip of the indicator rod 40 by one dimension of the cursor.

This ensures that the cursor 200 is not concealed by the shadow of the indicator rod 40, and the pointing position of the presenter 30 can be indicated reliably and in an easy-to-see manner by the cursor 200.

The cursor control section 120 could also be configured in such a manner that details of the cursor 200, such as the size, shape, and color thereof, are controlled in accordance with the thickness of the tip of the shadow region 300 of the pointing image. If, for example, the shadow region 300 of the pointing image is narrow, the position of the tip thereof would be difficult to identify accurately, so the pointing position can be made easier for the audience to see by displaying the cursor 200 large.

If the cursor 200 is displayed on a line extending from the indicator rod 40, as shown in FIG. 11A, it is possible that the cursor 200 will be concealed by the peripheral edge portion of the display region 12 or it might appear in an area that cannot be displayed.

Figure 11B:
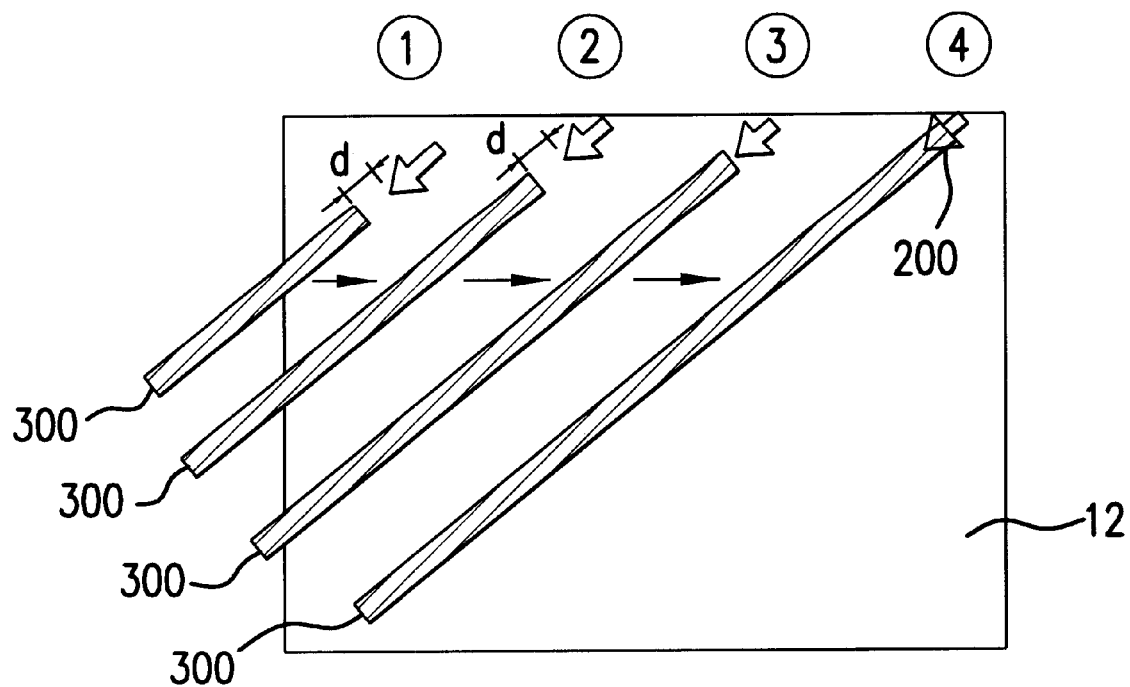
FIG. 11B is an illustrative view of cursor display near the peripheral edge of the display region.

For that reason, when the pointing position approaches the peripheral edge portion of the display screen and thus a fixed distance=d can no longer be maintained along the line extending from the shadow region 300 of the pointing image, as shown at ② in FIG. 11B, the cursor 200 could be displayed closer to the pointing position (as shown at ③ in this figure) or overlaying the pointing position (as shown at ④ in this figure). The cursor 200 could also be controlling in such a manner that a detail thereof, such as its size, color, or shape, varies in accordance with the area by which the cursor 200 overlaps the tip of the shadow region 300 of the pointing image. In this figure, ③ shows an example in which the size and shape of the cursor are varied and ④ shows an example in which the color thereof is varied. This ensures that the cursor 200 does not merge with the shadow of the indicator rod 40 and become invisible to the audience, even at the peripheral edge portion of the display screen, and also makes the pointing position easier to see.

Figure 21:
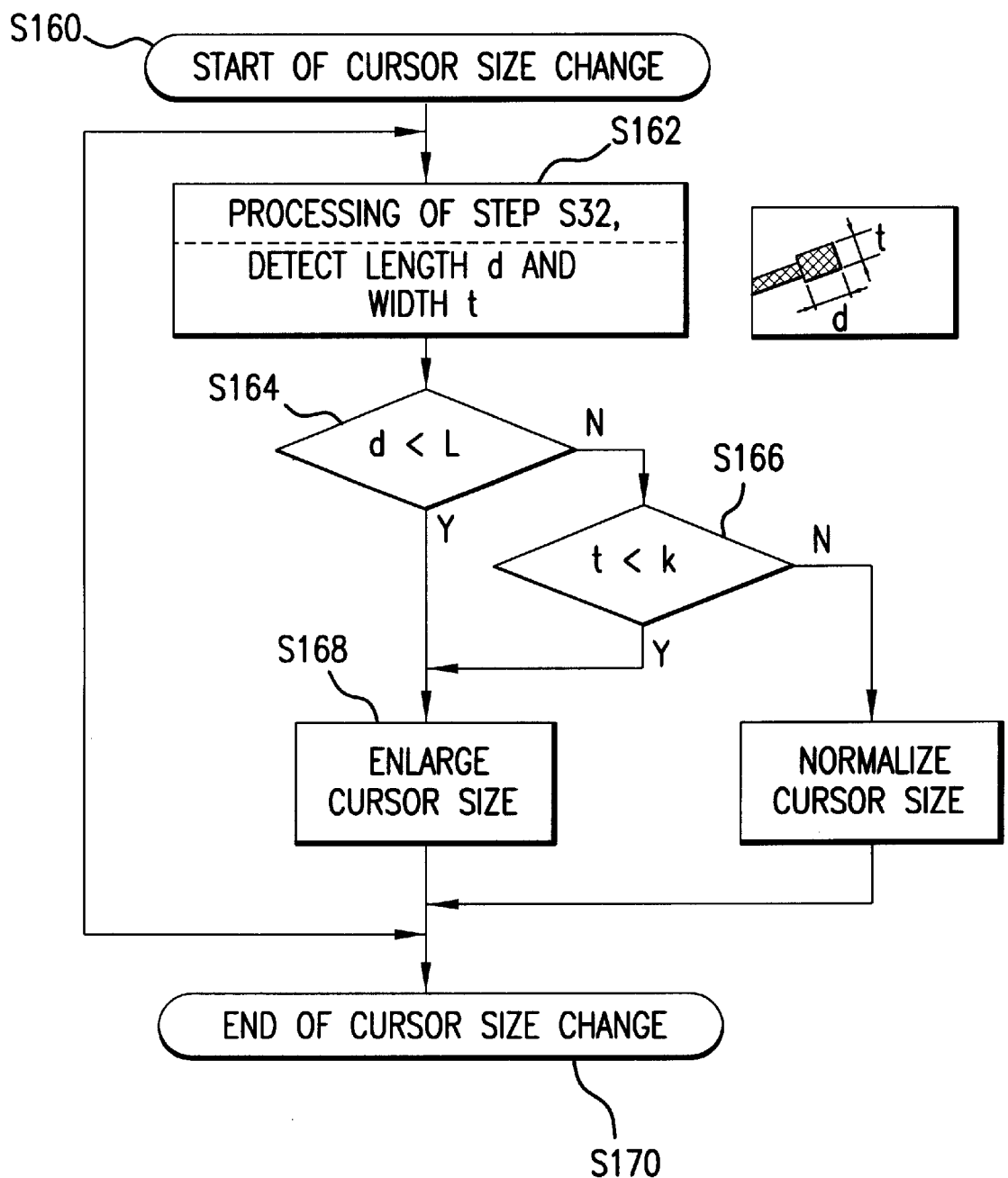
FIG. 21 is a flowchart of the operation of changing the cursor size in the present invention.

The algorithm used when changing the cursor size as described above is shown in FIG. 21.

First of all, in step S162, a length d and a width t are calculated as part of the area calculation of step S32 of FIG. 8. In the present embodiment of the invention, the shaft portion of the indicator rod 40 is of a different shape from the tip portion thereof, but the shaft portion of the indicator rod 40 could equally well be of the same shape as the tip portion. In this case, a length d' corresponding to the tip portion of the indicator rod 40 is cut off, so that the tip shape can be considered to have a length d' and a width t.

The length d in the longitudinal direction of the detection target 304 of the detected pointing image is then compared with a previously determined freely settable length L (step S164). If d <L, the tip shape is determined to be smaller than the setting so that the size of the cursor 200 is made larger. If d >L, on the other hand, the tip can be determined to be sufficiently large.

Next, step S166 compares the width t of the detection target 304 of the detected pointing image with a previously set width k. If t<k, the tip shape is determined to be smaller than the setting, in a similar manner to the length comparison, and the size of the cursor 200 is changed to be larger. If t>k, on the other hand, the tip is determined to be sufficiently large.

This processing is done each time that step S34 is executed, enabling real-time cursor control.

Figure 12B:
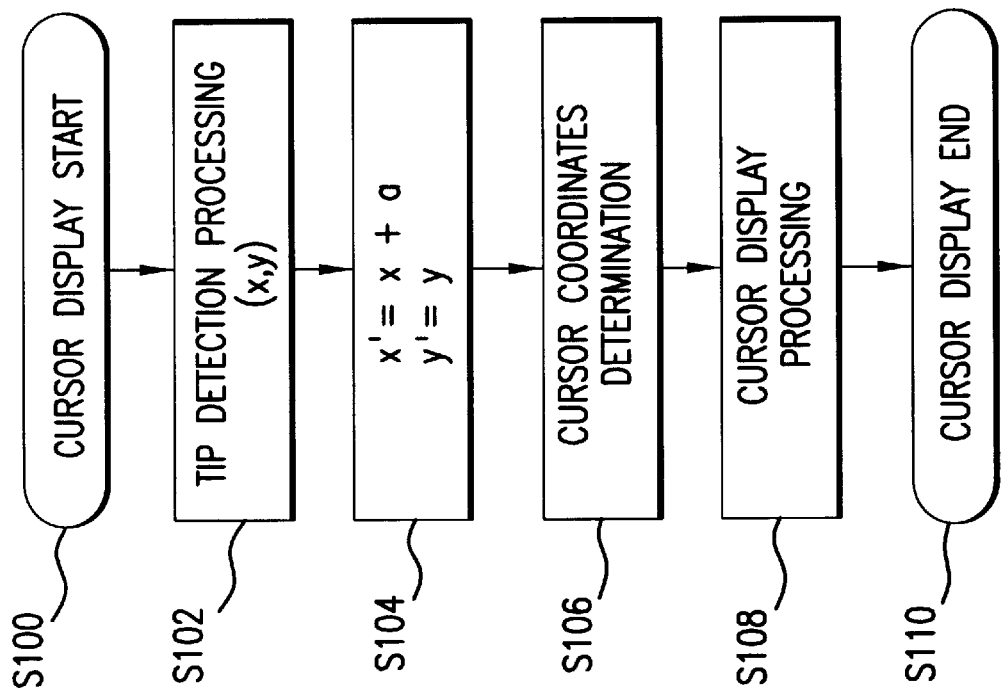
FIG. 12B is an illustrative view of the algorithm for displaying the cursor facing sideways in the horizontal direction.
Figure 12A:
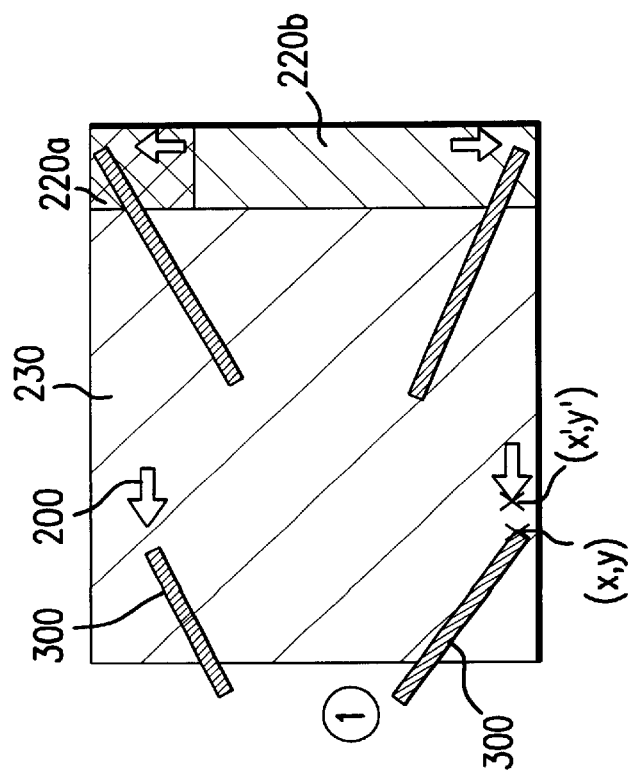
FIG. 12A is an illustrative view of an example of display in which the facing direction of the cursor is changed, based on the pointing position.

The cursor control section 120 could also control the display position of the cursor 200 as shown in FIG. 12A.

If the presenter 30 gives the presentation while standing on the left side facing the display region 12, for example, the display region 12 can be divided into a narrow region 220 along the right edge and a remaining region 230, and the narrow region 220 along the right edge can be further divided into a region 220a on the upper side and a remaining region 220b on the lower side. If the pointing position is in the region 230 that excludes the right edge, the cursor 200 is displayed orientated horizontally to the left, on the same level as the pointing position. If the pointing position is in the upper-wide region 220a on the right edge, the cursor 200 is displayed orientated upward on the lower side of the pointing position. If the pointing position is in the lower-side region 220b excluding the upper side on the right edge, the cursor 200 is displayed orientated downward on the upper side of the pointing position. This makes it possible to prevent the occurrence of a state that can cause the cursor 200 to become concealed by the right edge of the screen image when the presenter gives a presentation while standing on the left side of the display region 12.

Similarly, when the presenter gives a presentation while standing at the right edge of the display region 12, the above described regions 220a and 220b could be provided on the left edge of the projection area and the display of the cursor 200 can be adjusted in a similar manner. In that case, the cursor is preferably displayed orientated horizontally to the right, on the same level as the pointing position, mainly in the region 230.

When the display of the cursor 200 is controlled as shown in FIG. 12A, the cursor control section 120 could be configured in such a manner as to enable switching of the direction of display of the cursor, depending on whether the presenter 30 is standing on the right side or the left side of the display region 12, by an input from the operator control section 130.

This makes it possible to implement a presentation system that is easy to use.

A specific example of the algorithm used to display the cursor at a fixed distance in the horizontal direction from the tip coordinates of the shadow region 300 of the pointing image, as shown at ① in FIG. 12A, is shown in FIG. 12B.

The algorithm for displaying the cursor is stated in step S100 and a step S102 detects the tip coordinates (x, y) of the pointing position.

Step S104 then calculates the tip coordinates (x', y') of the cursor, based on the detected coordinates (x, y), to determine the cursor coordinates (x', y') (S106).

Step S108 performs processing for controlling the cursor so that it is displayed at those cursor coordinates (x', y'), to enable the display of the cursor at the desired position on the display screen image.

Figure 19:
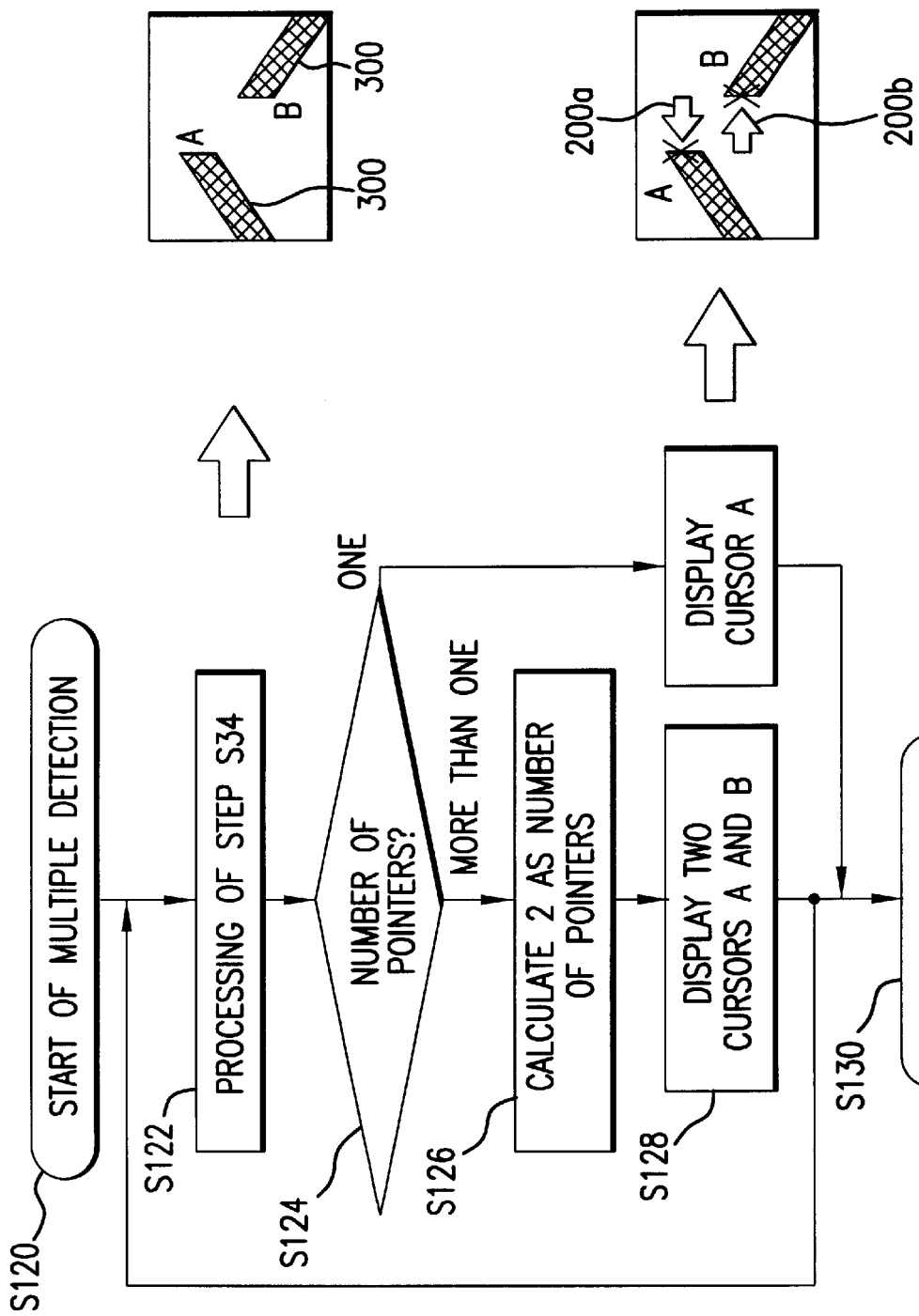
FIG. 19 is a detailed flowchart of the operation of displaying cursors which correspond to a plurality of pointers in the present embodiment.

The description now turns to a method by which a plurality of pointing positions is detected and the display of a plurality of cursors is controlled independently, with reference to FIG. 19.

First of all, step S122 performs the processing to extract the detection target 304 of the pointing position in step S34 of FIG. 8, and step S124 checks the number of extracted labels. In this case, ordinary processing for displaying a single cursor can be done if the number of extracted labels is one. If detection targets 304 are extracted for a plurality of pointing images in step S124, the number thereof is calculated in step S126 and processing to display the equivalent number of cursors is done in step S128.

This series or processes is repeated to display a cursor at each pointing image position.

A specific algorithm illustrated in FIG. 20 is used when a plurality of cursors is displayed by the method described above, where one of these cursors is to be fixed at the position at which the cursor is displayed and the position of another cursor is to be controlled freely.

The presenter 30 uses the indicator rod 40 to indicated a desired position on the display region 12, as shown at ① of FIG. 20, and a first cursor 202 is displayed at that pointing position (steps S142 and S144).

The presentation system of the present embodiment is provided with a function switch 140 to which a predetermined function is allocated, as will be described below. Operating this function switch 140 sends an instruction to temporarily halt the motion of the first cursor 202 (step S146) so that the display position of the first cursor 202 is fixed as shown at ② in FIG. 20 (step S148).

Next, as shown at ③ in FIG. 20, a point that is not the previous point on the display region 12 is indicated, and a second cursor 204 is displayed at the new pointing position (steps S150 and S152).

This means that the old and new pointing positions can be indicated simultaneously and also separately. In particular, it is preferable to perform processing to distinguish the previously display first cursor 202 from the second cursor 204 that is displayed thereafter, by making the color or shape of the second cursor 204 different, or flashing the display.

The configuration could be such that the first cursor 202, which is displayed fixed remains fixed at that display position until the presenter 30 operates the function switch 140 in step S154, or the fixed display could be released after a certain period of time has elapsed. The first cursor 202 that is released from the fixed display in this manner is not detected as a pointing image on the display region 12, so it disappears from the screen image as shown at ④ of FIG. 20. The second cursor 204, which is displayed continuously, on the other hand, is displayed so that it follows the indication on the screen image, and the second cursor 204 is handled subsequently as if it is the first cursor 202.

Any function than the above described functions that can be activated in a similar manner by a left-click or right-click of the mouse can be allocated to the function switch 140.

This function switch 140 could be provided integrally with the indicator rod 40, or it could be provided as a separate unit that the presenter 30 can carry freely.

The above described configuration makes it possible for the presenter 30 to use tho indicator rod 40 to guide the cursor 200 to a desired position, then cause the cursor control section 120 to perform processing similar to that obtained by left-click or right-click of the mouse, by operating the function switch 140.

It is also possible to draw an underline at a desired position of the image displayed on the display region 12 or input handwriting by moving the pointing position, by allocating an underline function or handwriting input function to the function switch 140.

Furthermore, allocating a temporary-halt function to the movement of the cursor 200 makes it possible for the presenter 30 to use the indicator rod 40 to move the cursor to a desired position then operate the function switch 140 to fix the display position of the cursor 200 until the function switch 140 is operated again.

4. Automatic Setting of Reference Value$_{ref}$

The description now turns to details of the reference value $V_{ref}$ set by the automatic reference value setting section 114.

To ensure that the shadow region 300 of the pointing image is extracted reliably from the image-acquisition signal that is output from the CCD camera 14, it is necessary to set the reference value $V_{ref}$, which is the threshold value for binary data, to the optimum value.

This reference value must be set to a value that is less than the lowest brightness level comprised within an image-acquisition signal that is created when the CCD camera 14 has acquired a picture of the image projected onto the display region 12. If a monochrome image-acquisition signal is output from the CCD camera 14, as in the present embodiment by way of example, the reference value must be set to a value that is less than that of the black brightness level. This ensures that the brightness level of the shadow region 300 of the pointing image is lower than the brightness level of the black color that has the lowest brightness level on the screen image.

Figure 14A:
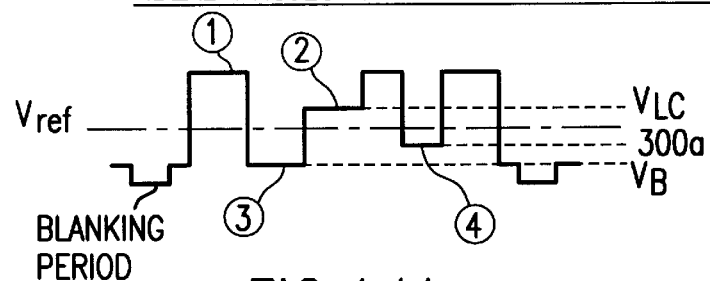
FIG. 14A is an illustrative view of the processing for setting the binary-data threshold valve $V_{ref}$ for extracting the shadow of the pointer from the image-acquisition signal in an ideal state.

The brightness levels of each are obtained by the acquisition of an image by the CCD camera 14 are shown in FIG. 14A.

In this case, a completely white image (a display-white region, shown at ① in the figure) and a pitch black image (a display-black region, show at ② in the figure) are projected on the display region 12 from the projector, and a state is also formed in which part of the display region 12 is covered so that the projected image is not displayed on part of the display region 12 (a real black area, shown at ③ in the figure). FIG. 14A shows the brightness level for each region, obtained by the CCD camera 14 acquiring the resultant image. A shadow cast by the indicator rod 40 (a detected-black region, shown at ④ in this figure) has a brightness level (300a) that lies between a brightness level of the image black (VLC) and a brightness level of real black (VB). Thus, to extract the shadow region 300 of the pointing image reliably, it is necessary to set the reference value $V_{ref}$ for binary data to a value that is less than the brightness level of image black (VLC) but greater than the brightness level of real black (VB). Note that the brightness levels in this figure are expressed as brightnesses levels in one horizontal scanning line of the CCD camera 14.

Figure 14B:
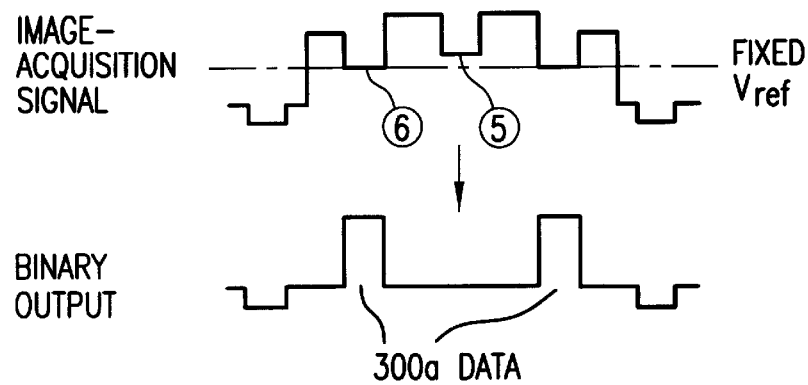
FIG. 14B is an illustrative view of the processing for setting the binary-data threshold value $V_{ref}$ for extracting the shadow of the pointer from the image-acquisition signal when there are brightness differences within the display region.

Note that FIG. 14A assumes an ideal display region environment and shows the brightness level of each region obtained when the image projected on the display region 12 is acquired under such conditions, but the brightness levels obtained by the CCD camera 14 from the image projected onto the display region 12 in practice are shown by way of example in FIG. 14B. FIG. 14B shows that the brightness levels of the image projected onto the display region 12 are fairly high at the center of the display region (show at ⑤ in this figure) but become lower nearer the edges of the display region (shown at ⑥ in this figure). A similar state can occur if there is a window near the display region 12 or the indoor lighting environment varies.

Therefore, if the level difference ΔV (hereinafter called margin) between the black level 300a of the shadow region 300 of the pointing image and the reference value $V_{ref}$ is set too low, a situation will occur in that it is not possible to detect the shadow region 300 of the pointing image reliably at the center. In other words, the binary-data processing output of FIG. 14B shows that, if there are large variations in the brightness level 300a of the shadow region 300 of the pointing image at the center (at ⑤ in this figure), this brightness level 300a of the shadow region 300 will not fall as far as below the reference value $V_{ref}$. In such a case, it will not be possible to extract this shadow region 300 reliably.

For that reason, the automatic reference value setting section 114 of the present embodiment of the invention is configured to enable automatic setting of the reference value $V_{ref}$ to the optimum value.

This is described in detail below.

Figure 15A:
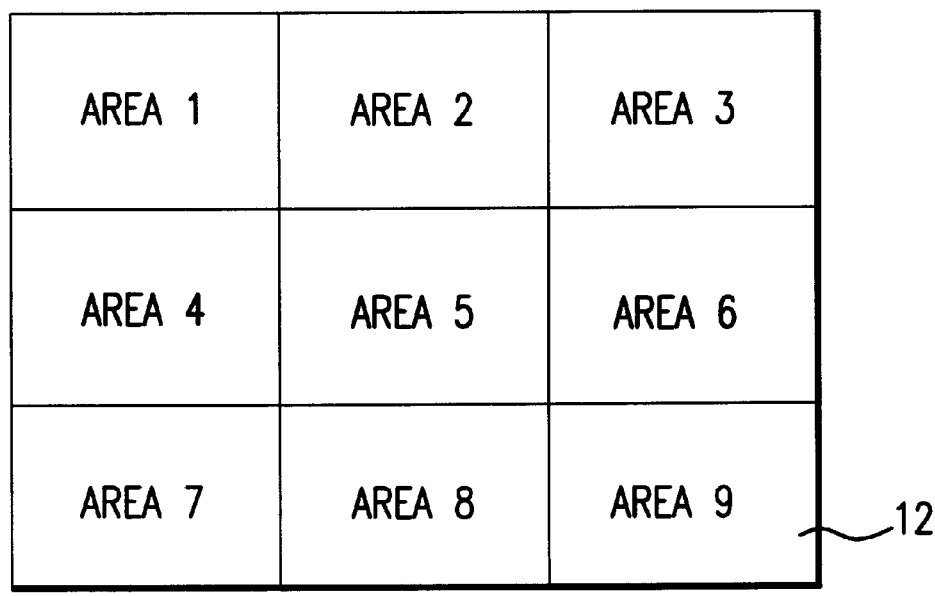
FIG. 15A is an illustrative view of the processing for dividing the display region into a plurality of regions and setting an individual reference value for each of these regions.

A state shown in FIG. 15A is that of an image projected onto the display region 12 that has been divided into a plurality of regions, which is nine regions in this case.

The automatic reference value setting section 114 of the present embodiment can set an individual reference value $V_{ref}$ for each of these partial areas.

Figure 14C:
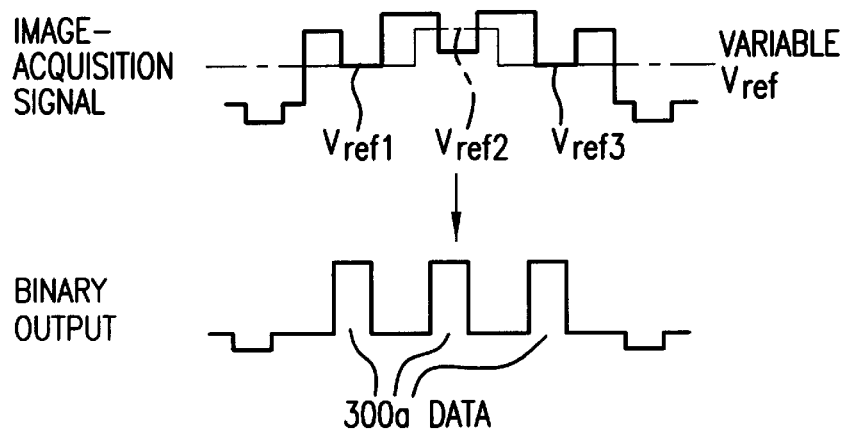
FIG. 14C is an illustrative view of the processing for setting the binary-data threshold value $V_{ref}$ for extracting the shadow of the pointer from the image-acquisition signal when reference values are modified to improve the brightness differences.

For example, the reference value is set to $V_{ref}1$, $V_{ref}2$, and $V_{ref}3$ for partial areas 1, 2, and 3, as shown in FIG. 14C.

This ensures that the shadow region 300 of the pointing image can be detected reliably even at the central portion of the screen image, where the brightness level is high (the portion shown at ⑤ in FIG. 14B).

To enable the setting of an individual reference value $V_{ref}$ for each partial area, a calibration pattern image generation section 124 in accordance with the present embodiment of the invention causes a predetermined calibration pattern image from the projector 10 onto the screen. At the same time, the automatic reference value setting section 114 verifies the data of the projected calibrating pattern image and the image-acquisition signal acquired by the CCD camera 14, and sets the optimal reference value $V_{ref}$ for each partial area.

Figure 15B:
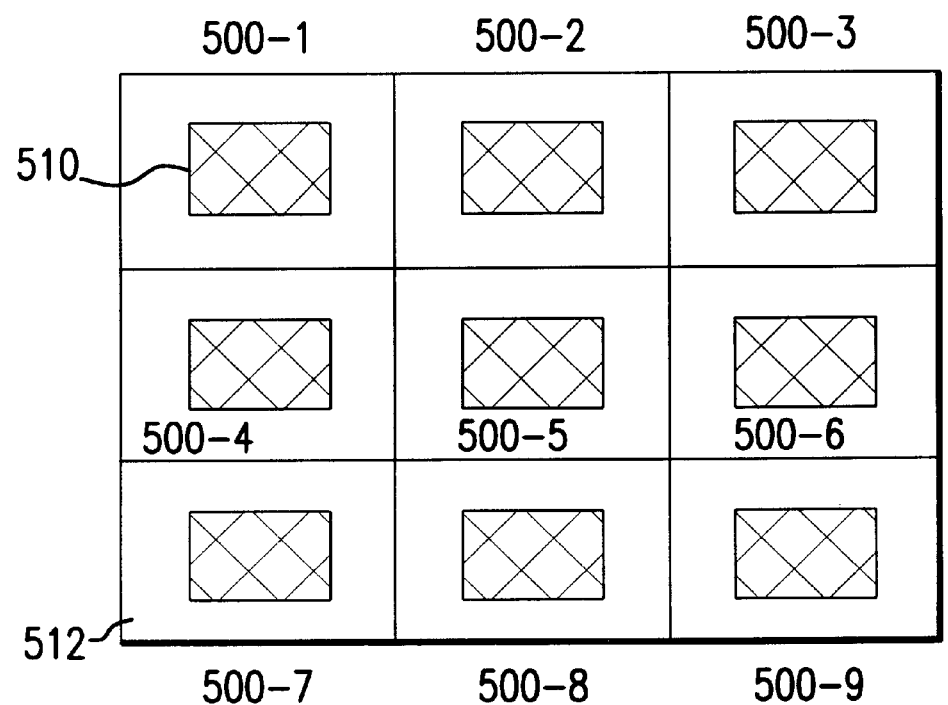
FIG. 15B is an illustrative view of an example of a calibration pattern image used when the reference values are set.

In this case, the calibration pattern image shown in FIG. 15B is configured in such a manner that it is projected onto the display region 12. This calibration pattern image 500 comprises nine area 500–1, 500–2, . . . 500–9 corresponding to the partial areas, where each area has a black area 510 at the center thereof, with a white area 512 disposed therearound. Thus the reference level of each partial area can be set to the optimum value from this calibration pattern image 500, by the disposition of a pattern in which areas 510 and 512 of different brightness levels, for white and black, in each area 500–1, 500–2, . . . 500–9.

Note that the calibration pattern image projected from the projector during this setting of reference values could be configured such that black, which has the lowest brightness level, forces the reference. It is also possible to project a calibration pattern image that has a completely black level over the entire area of the calibration pattern image.

However, even with the same black, the brightness level of black in the image projected onto the display region 12 and acquired by the CCD camera 14 will differ slightly between a case in which the surroundings are completely black and a case in which the surroundings are completely white.

The present embodiment uses a calibration pattern formed of a combination of the black area 510 and the white are 512 having different brightness levels is set for each area 500–1, 500–2, . . . 500–9 and projects that combination image as the calibration pattern image 500 onto the display region 12, so that each reference value can be set to the optimum value even in the above cases. This makes it possible to automatically set the reference value for binary data to the optimum value for each partial area.

Figure 16:
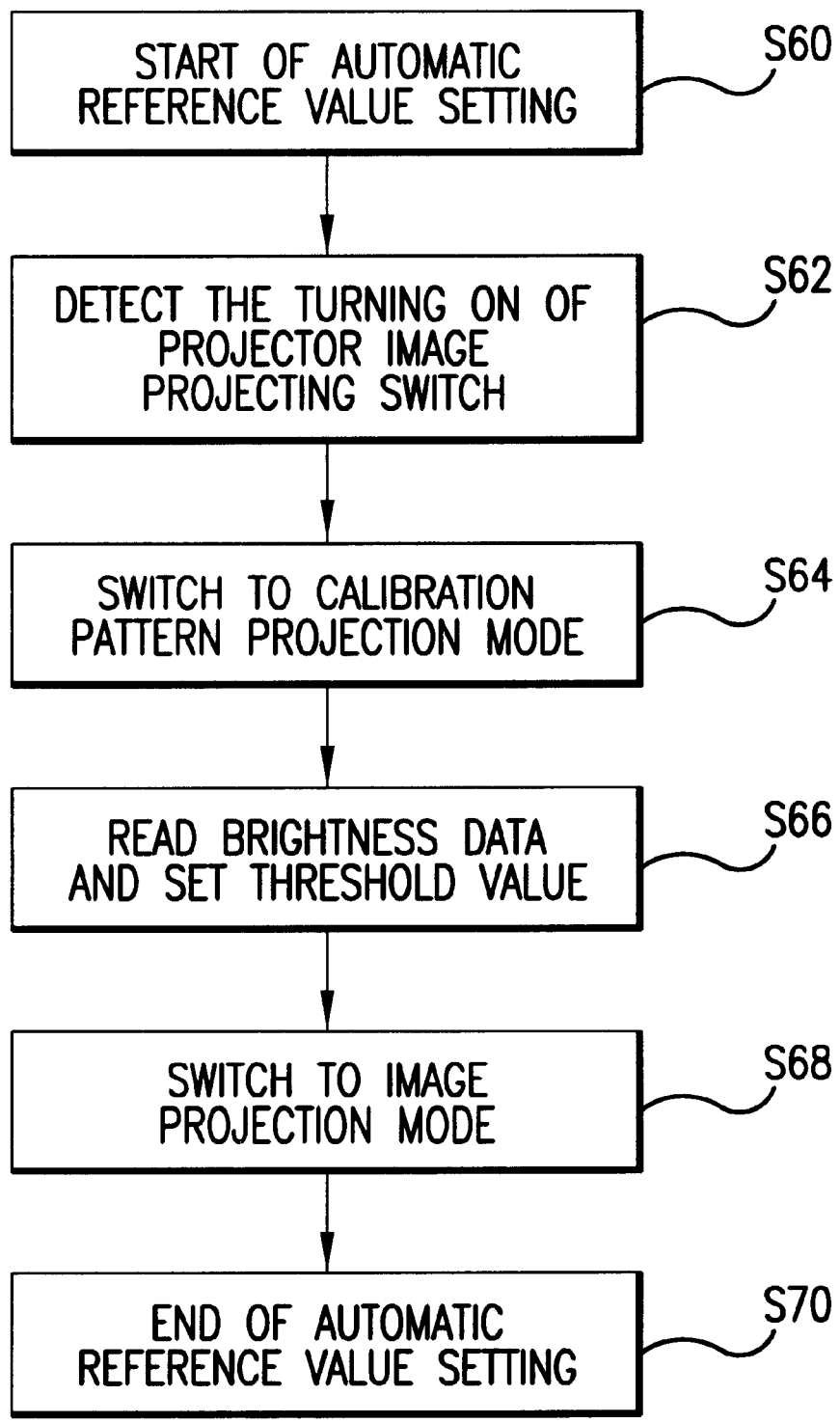
FIG. 16 is a flowchart of an operation of automatically setting the reference value when the system starts operating.

A flowchart of the automatic setting of the reference values when the presentation system starts operating is shown in FIG. 16. The automatic reference value setting section 114 starts the automatic setting of reference values when the system starts operating (step S60). First of all, the turning on of an image projection switch of the projector 10 is detected (step S62), then the calibration pattern image shown in FIG. 15B is projected from the projector 10 onto the display region 12 (step S64).

The automatic reference value setting section 114 verifies previously determined data for the brightness levels of the calibration pattern image against the brightness level of the position that corresponds to the image-acquisition signal that is output from the CCD camera 14, and sets the optimal reference value $V_{ref}$ for each partial area (step S66).

In this case, the signal brightness level corresponding to the black area 510 of the calibration pattern image is read from the image-acquisition signal for each area, and a reference value $V_{ref}$ having a predetermined margin with respect to that brightness level is set for each partial area.

After this setting has ended, the automatic reference value setting action 114 ends the projection of the calibration pattern image and switches the image output of the projector 10 to ordinary image input mode (step S68), then ends the automatic reference value setting operation (step S70).

In this manner, the present embodiment makes it possible to automatically set the threshold value $V_{ref}$ for binary-data processing to the optimum value for each partial area when the system starts operating.

Figure 17:
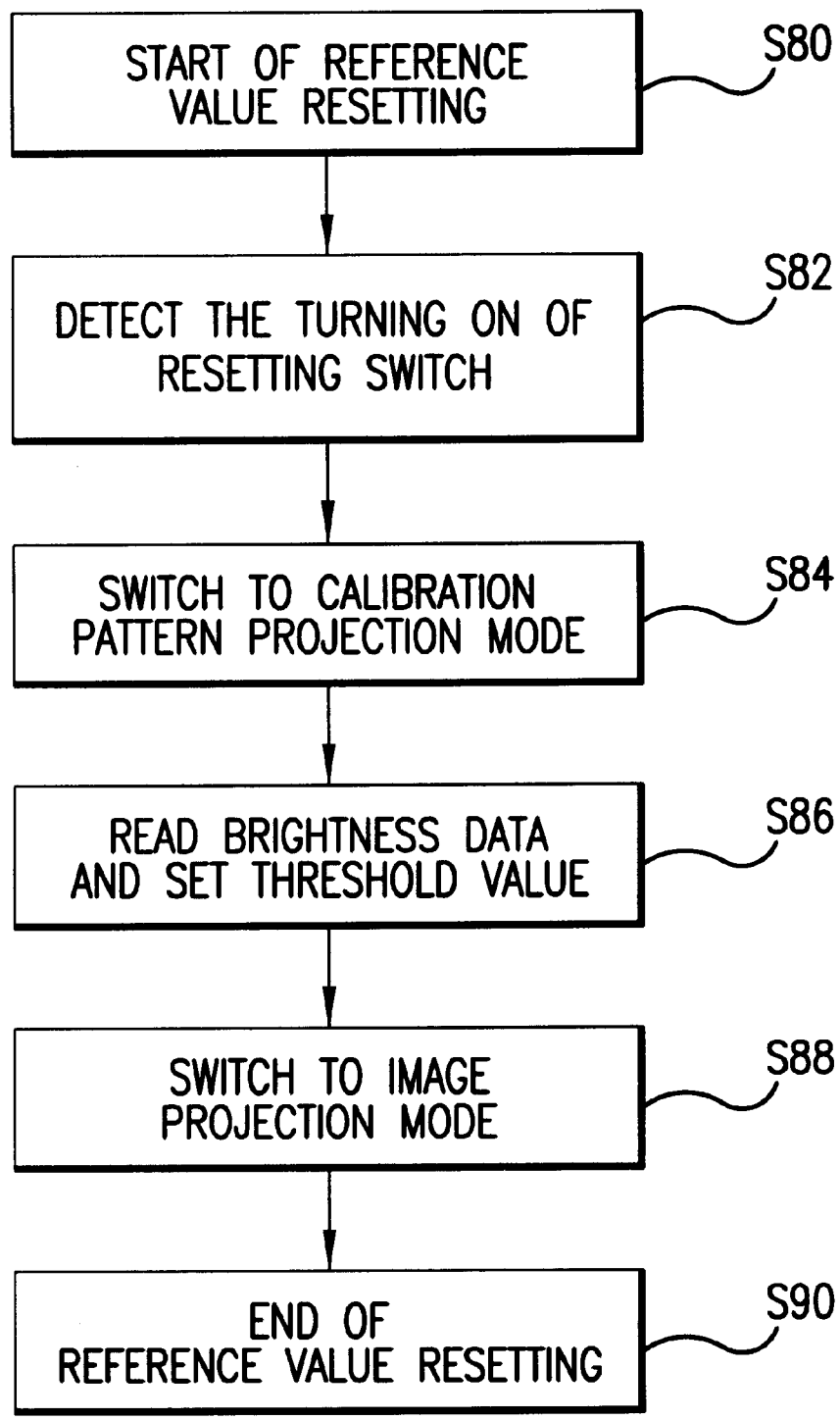
FIG. 17 is a flowchart of the operation of resetting the reference value after the system has started operating.

A flowchart for resetting the reference value $V_{ref}$ after the system has started operating is shown in FIG. 17.

When the user operates a reference value reset switch 132, the automatic reference value setting section 114 detects the operation of this reset switch 132 (step S82) and starts the reference value reset operation of steps S84 to S90.

Note that steps S84 to S88 are similar to those of steps S64 to S68 of FIG. 16, so detailed description thereof is omitted.

Thus the present embodiment makes it possible to automatically set the reference values to optimum values even after the system has started operating, so that, if the usage environment has changed during the presentations (for example, when the environment outside a window has become brighter or darker, or the brightness level on the display region 12 has changed), the user can set the reference value $V_{ref}$ for binary-data processing to the optimum value for the current usage environment by pressing the reference value reset switch 132.

Figure 18:
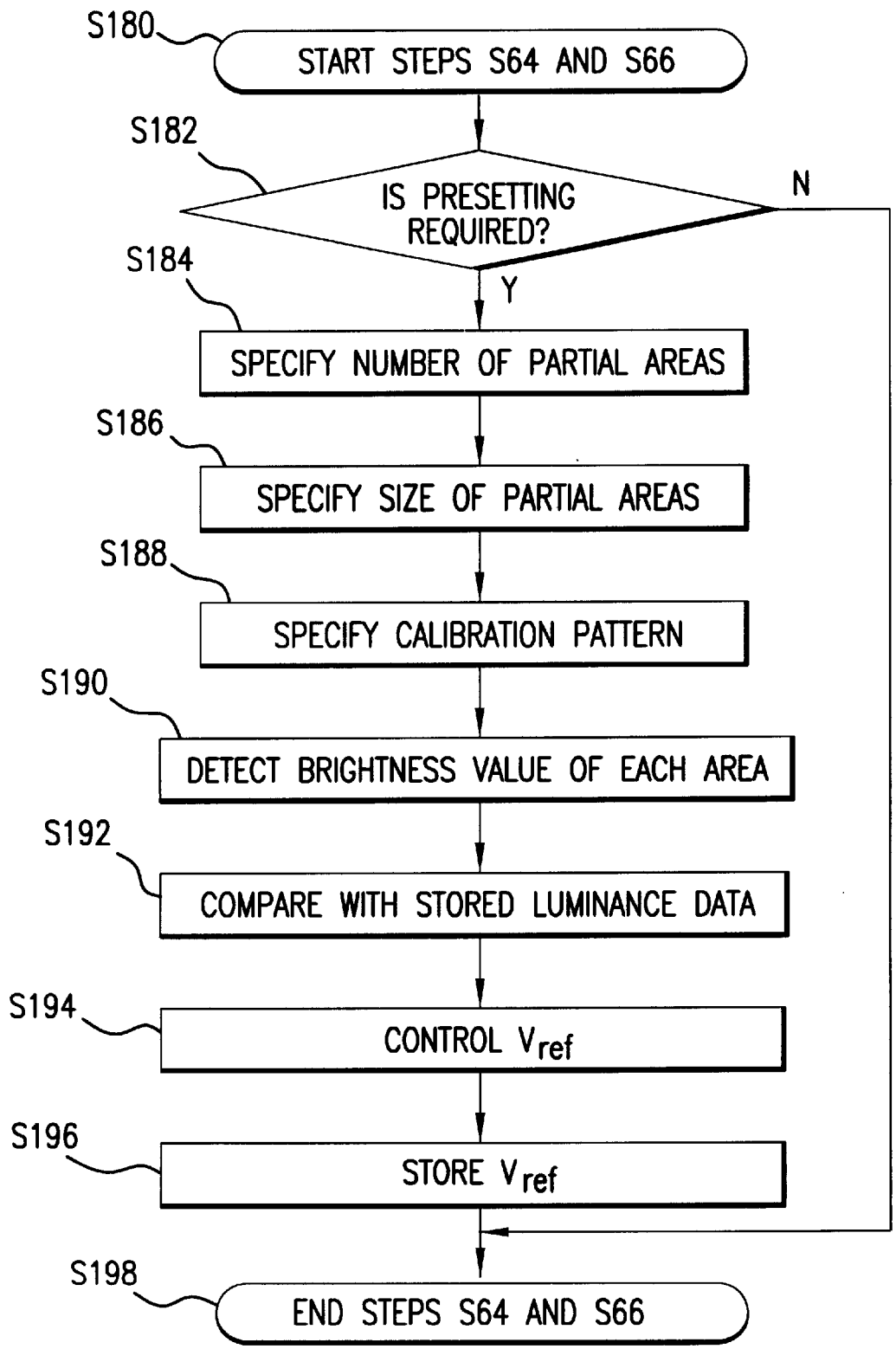
FIG. 18 is a detailed flowchart of the operation of automatically setting the reference value in the present embodiment.

A specific algorithm shown in FIG. 18 illustrates details of the steps S64 and S66 of FIG. 16 and the steps S84 and S86 of FIG. 17.

First of all, step S182 selects whether the reference value $V_{ref}$ is to be present or whether the previously used reference value $V_{ref}$ is to be used without change.

When the usage environment is exactly the same as it was previously, or is similar to that environment, No can be selected to use the previously used reference value $V_{ref}$. This is convenient in that it makes it possible to omit the reference value setting.

When, on the other hand, Yes is selected in step S182 to preset the reference value $V_{ref}$, the number of areas for which reference values are to be set is specified (step S184) and also the size thereof is specified (step S186). This makes it possible to determine the areas shown in FIG. 15A. Next, the type of calibrating pattern, such as that shown in FIG. 15B, is selected in step S188.

Brightness data is then detected for each partial area (step S190), and the thus detected brightness data is compared with pre-stored brightness data in step S192. Based on the results of this comparison, the reference value $V_{ref}$ is controlled to a desired value (step S194) and that value is stored (step S196).

The processing of steps S64 and S66 of FIG. 16 and of steps S84 and S86 of FIG. 17 ends in step 198.

In this manner, the present embodiment of the invention automatically sets each reference value $V_{ref}$ to the optimum value, making it possible to extract the shadow region 300 of the pointing image accurately from the image-acquisition signal.

The present embodiment of the invention was described as involving the automatic setting of a different reference value for each area, by way of example, but the configuration could also be such that a single reference value is set automatically for all areas, if necessary.

5. Hardware Configuration of Processing Section

Figure 23:
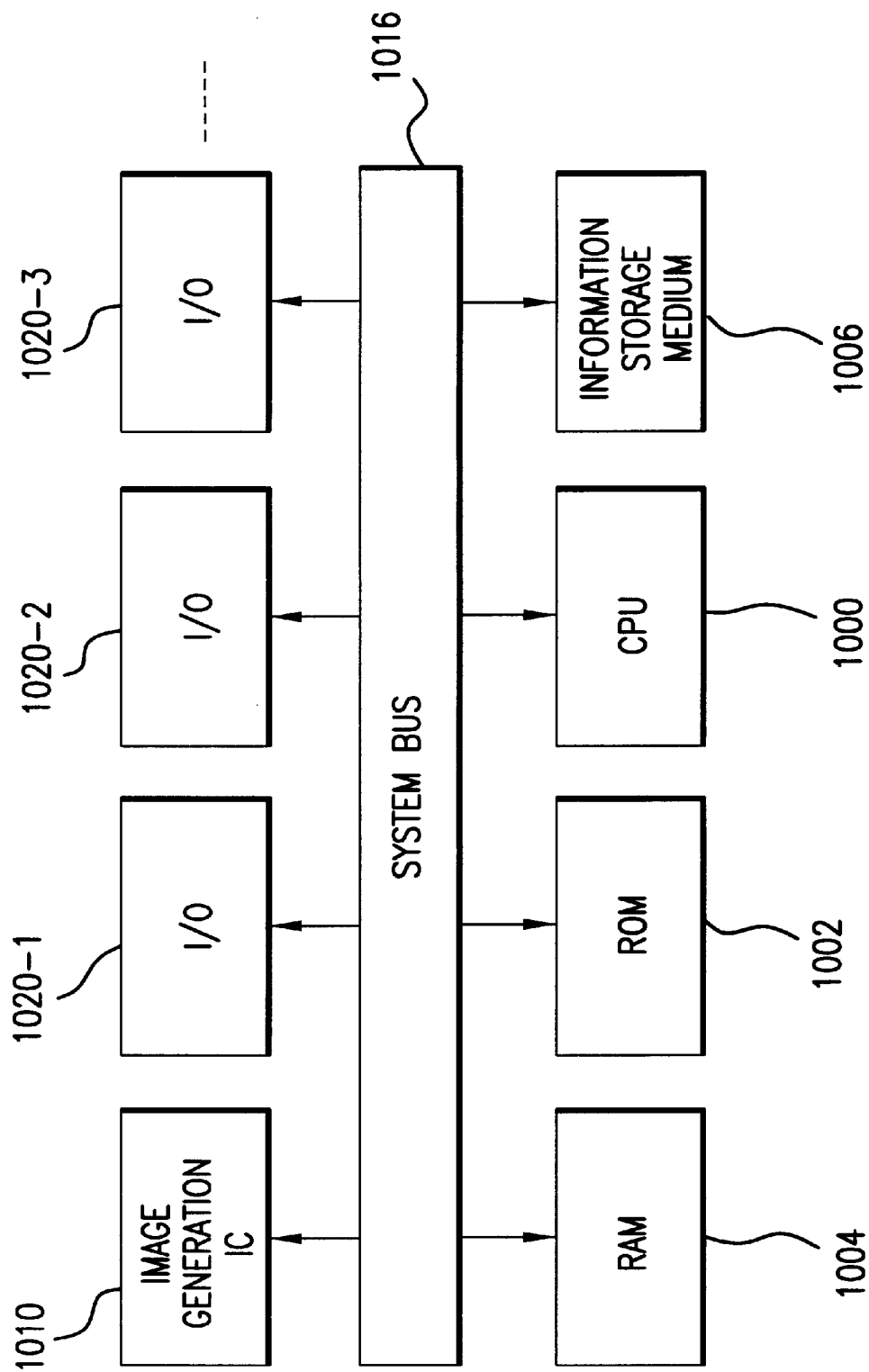
FIG. 23 is an illustrative view of the hardware configuration of the processing section in the present invention.

The description now turns to an example of the configuration of hardware that can be implement this processing section 110, with reference to FIG. 23. In the apparatus shown in this figure, a CPU 1000, ROM 1002, RAM 1004, an information storage medium 1006, an image generation IC 1010, and I/O ports 1020-1, 1020-2, . . . are connected together by a system bus 1016 in such a manner that data can be mutually transferred therebetween. The CCD camera 14, the function switch 140, the operator control section 130, and the projector 10 are connected to other equipment by the I/O ports 1020-1, 1020-2, . . . .

Programs and image data are mainly stored in the information storage medium 1006.

The CPU 1000 controls the entire apparatus and processes data in accordance with the program stored in the information storage medium 1006 with the program stored in the information storage medium 1006 and programs stored in the ROM 1002. The RAM 1004 is a storage means that is used as a work space for the CPU 1000, and specific details from the information storage medium 1006 or the ROM 1002, or the results of calculations by the CPU 1000, are stored therein. A data configuration having a logical structure suitable for implementing the present embodiment of the invention is constructed within this RAM or information storage medium.

The processing described with reference to FIGS. 1 to 7, 10, 11, and 13 to 15 is implemented by components such as the information storage medium 1006 that contains programs for performing processing such as that shown in the flowcharts of FIGS. 8, 9, 12, and 16 to 22, the CPU 1000 that operates in accordance with those programs, and the image generation IC 1010. Note that the processing performed by the image generation IC 1010 could be performed in a software manner by means such as the CPU 1000 or an ordinary DSP.

Note that the present invention is not limited to the previously described embodiments, and thus many modifications thereto are possible within the range of the invention as disclosed herein.

For example, a CCD camera or the like that acquires a picture as a color image could be used, if necessary.

In addition, the method of extracting the real-image region 302 of the pointing image could be such that the movement of the arm of the presenter 30 and the indicator rod 40 are detected, instead of the previously described method in which the brightness level is detected on the basis of an image-acquisition signal.

What is claimed is:

1. A pointing position detection device comprising:
   image-acquisition means for acquiring an image of a display region in which an image is displayed;
   reference-value setting means for setting a reference value for separating an image region of a pointing image included within said display region, from an image-acquisition signal of said image-acquisition means; and
   position detection means for detecting a pointing position from said image region of said pointing image, by comparing said image-acquisition signal and said reference value and thus extracting said image region of said pointing image,
   wherein said reference-value setting means is configured to be capable of modifying said reference value.

2. A presentation system comprising:
   a projector that displays an image in a display region;
   image-acquisition means for acquiring an image of the display region;
   position detection means for detecting a pointing position from an image region of a pointing image included within said display region based on an image-acquisition signal of said image-acquisition means; and
   cursor control means for controlling a position of a cursor relative to the image region included within the image displayed by the projector, based on the detected pointing position relative to the display region.

3. The presentation system as defined in claim 2, wherein said position detection means captures a rod-shaped image region as said image region of said pointing image, based on the continuous shape of said image region included within said display region, and detects a tip position of said image region as said pointing position.

4. The presentation system as defined in claim 2, wherein said cursor control means displays a plurality of cursors simultaneously within said display region and controls a position of each of the cursors independently.

5. The presentation system as defined in claim 2, wherein said cursor control means controls a cursor position to indicate the detected point position, at a position having no overlap with said image region of said pointing image.

6. The presentation system as defined in claim 2, wherein said cursor control means controls a cursor size to be displayed according to a tip size of an image region of said pointing image having a rod like shape.

7. The presentation system as defined in claim 2, wherein said cursor control means comprises position-fixing means for fixedly displaying said cursor at a desired position within said display region.

8. The presentation system as defined in claim 2, wherein said image display means comprises an image projection means for projecting an image on a screen, and is disposed in such a manner as to project an image from in front of or behind said screen.

9. The presentation system as defined in claim 8, comprising a polarizing plate which is provided in a light path of said image-acquisition means and which absorbs light projected from an image projection means.

10. The presentation system as defined in claim 2, wherein said image-acquisition means freely adjusts an image-acquisition area with respect to said display region.

11. The presentation system as defined in claim 2, further comprising illumination means for illuminating a low-brightness level region of said display region.

12. The presentation system as defined in claim 2, further comprising:
   function input means to which a predetermined function is allocated; and
   means for performing data processing according to a function being input.

13. A presentation system comprising:
   image display means for displaying an image;
   image-acquisition means for acquiring an image of a display region in which an image is displayed;
   reference-value setting means for setting a reference value for separating an image region of a printing image included within said display region from an image-acquisition signal of said image-acquisition means;
   position detection means for detecting a pointing position from said image region of said pointing image, by comparing said image-acquisition signal and said reference value and thus extracting said image region of said pointing image; and
   cursor control means for controlling a position of a cursor included within the image displayed by said image display means, based on said detected pointing position,
   wherein said reference-value setting means is configured to be capable of modifying said reference value.

14. The presentation system as defined in claim 13, further comprising:
   calibration pattern image generation means for displaying a predetermined calibration pattern image from said image display means to said display region,
   wherein said reference-value setting means automatically sets a reference value for extracting said image region of said pointing image, based on data of said calibration pattern image and said image-acquisition signal.

15. The presentation system as defined in claim 14, wherein said reference-value setting means divides said display region into a plurality of regions and sets an individual reference value for each of the divided regions.

16. The presentation system as defined in claim 14, wherein said calibration pattern image generation means displays a predetermined calibration pattern image formed by combining a plurality of regions having different brightnesses on said display region.

17. The presentation system as defined in claim 14, further comprising:
   indication means for setting a reference value,
   wherein, when a reference-value setting instruction is input by said indicating means;
      said calibration pattern image generation means causes the display of a calibration pattern image from said image display means on said display region; and
      said reference-value setting means automatically sets a reference value for extracting said image region of said pointing image, based on data of said calibration pattern image and said image-acquisition signal.

18. A computer useable information embodied on computer-readable medium comprising:
   information for detecting a pointing position of an image region of a pointing image included in a display region, based on an image-acquisition signal of said display region; and
   information for controlling a position of a cursor relative to the image region included within an image displayed by a projector that displays the image in the display region, based on the detected pointing position relative to the display region.

19. The computer useable information embodied on computer-readable medium is defined in claim 18, wherein said information for controlling a cursor comprises information for controlling a cursor position to indicate the detected pointing position, at a position having no overlap with said image region of said pointing image.

20. The computer useable information embodied on computer-readable medium as defined in claim 18, wherein said information for controlling a cursor comprises information for controlling a cursor size to be displayed according to a tip size of said image region of said pointing image having a rod like shape.

21. The computer useable information embodied on computer-readable medium as defined in claim 18, wherein said information for controlling a cursor comprises position-fixing information for fixedly displaying said cursor at a desired position within said display region.

22. A computer useable information embodied on computer-readable medium for controlling a presentation system comprising:

reference-value setting information for setting a reference value for separating an image region of a pointing image included within a display region from an image-acquisition signal of image-acquisition means;

position detection information for detecting a pointing position from said image region of said pointing image, by comparing said image-acquisition signal and said reference value and thus extracting said image region of said pointing image; and cursor control information for controlling a position of a cursor included within an image displayed by image display means, based on the detected pointing position, wherein said reference-value setting information comprises information for modifying said reference value.

23. The computer useable information embodied on computer-readable medium as defined in claim 22, further comprising calibration pattern control information for displaying a predetermined calibration pattern image from said image display means to said display region, wherein said reference-value setting information comprises information for automatically setting a reference value for extracting an image region of said pointing image, based on data of said calibration pattern image and said image-acquisition signal.

24. The computer useable information embodied on computer-readable medium as defined in claim 23, wherein said reference-value setting information comprises information for dividing said display region into a plurality of regions and automatically setting an individual reference value for each of the divided regions.

25. A cursor position control method comprising:

an image display step of displaying an image in a display region;

an image-acquisition step of acquiring an image of the display region;

a position detection step of detecting a pointing position of an image region of a pointing image included within said display region from an image-acquisition signal of said image-acquisition means; and a cursor control step of controlling a position of a cursor relative to an image region included within the image, based on the detected pointing position relative to the display region.

26. A pointing position detection method comprising:

an image-acquisition step of acquiring an image of a display region in which an image is displayed; and a position detection step of comparing an image-acquisition signal with a reference value for separating an image region of a pointing image and thus extracting said image region of said pointing image, then detecting a pointing position from said image region of said pointing image, wherein said position detection step comprises a step of modifying said reference value for separating said image region of said pointing image included within said display region from said image-acquisition signal of an image-acquisition means.

27. A method of detecting a pointing position for a presentation, comprising:

an image-acquisition step of acquiring an image of a display region in which an image is displayed; and a position detection step of comparing an image-acquisition signal with a reference value for separating an image region of a pointing image and thus extracting said image region of said pointing image, then detecting a pointing position from said image region of said pointing image; and a cursor control step of controlling a position of a cursor included within an image displayed by an image display means, based on said detected pointing position, wherein said position detection step comprises a step of modifying said reference value for separating said image region of said pointing image included within said display region from said image-acquisition signal of an image-acquisition means.

* * * * *